US011964390B2

(12) United States Patent
Niwa

(10) Patent No.: US 11,964,390 B2
(45) Date of Patent: Apr. 23, 2024

(54) COUNTER UNIT, COUNTER UNIT CONTROL METHOD, CONTROL DEVICE, AND CONTROL SYSTEM

(71) Applicant: OMRON Corporation, Kyoto (JP)

(72) Inventor: Yoshimi Niwa, Kyoto (JP)

(73) Assignee: OMRON Corporation, Kyoto (JP)

( * ) Notice: Subject to any disclaimer, the term of this patent is extended or adjusted under 35 U.S.C. 154(b) by 289 days.

(21) Appl. No.: 17/432,100

(22) PCT Filed: Feb. 3, 2020

(86) PCT No.: PCT/JP2020/003898
§ 371 (c)(1),
(2) Date: Aug. 19, 2021

(87) PCT Pub. No.: WO2020/183977
PCT Pub. Date: Sep. 17, 2020

(65) Prior Publication Data
US 2022/0143818 A1 May 12, 2022

(30) Foreign Application Priority Data

Mar. 8, 2019 (JP) .................................. 2019-042978

(51) Int. Cl.
*B25J 9/16* (2006.01)
*B25J 9/00* (2006.01)
(Continued)

(52) U.S. Cl.
CPC ........... *B25J 9/1602* (2013.01); *B25J 9/0093* (2013.01); *B25J 9/1697* (2013.01);
(Continued)

(58) Field of Classification Search
CPC ...... B25J 9/1602; B25J 9/0093; B25J 9/1697; B25J 9/16; G05B 19/4182;
(Continued)

(56) References Cited

U.S. PATENT DOCUMENTS 10,155,317 B2 * 12/2018 Shimamura ........... G06T 7/0004
2012/0236140 A1 * 9/2012 Hazeyama ............. B25J 9/1697
348/94
(Continued)

FOREIGN PATENT DOCUMENTS

| CN | 103313921 | 9/2013 |
| CN | 104509038 | 4/2015 |

(Continued)

OTHER PUBLICATIONS

English translation for JP2009157913 (Year: 2009).*
(Continued)

*Primary Examiner* — Rachid Bendidi
(74) *Attorney, Agent, or Firm* — JCIPRNET

(57) ABSTRACT

A counter unit, a counter unit control method, a control device, and a control system are provided. A counter unit (10) executes an output to an actuator (40) at a time point when a waiting time indicated by a timing adjustment value (Ta) received from PLC (20) has elapsed since it was determined that an actual measurement value obtained by using a pulse signal has matched with a target value.

10 Claims, 13 Drawing Sheets

(51) Int. Cl.
*G05B 19/41* (2006.01)
*G05B 19/418* (2006.01)

(52) U.S. Cl.
CPC ..... *G05B 19/4182* (2013.01); *G05B 19/4183* (2013.01); *G05B 2219/40005* (2013.01); *G05B 2219/40554* (2013.01)

(58) Field of Classification Search
CPC ...... G05B 19/4183; G05B 2219/40005; G05B 2219/40554; G05B 2219/39102; G05B 2219/40607; G05B 19/07
See application file for complete search history.

(56) References Cited

U.S. PATENT DOCUMENTS

| | | | | |
|---|---|---|---|---|
| 2013/0329954 | A1* | 12/2013 | Ikeda | G06T 1/0007 382/103 |
| 2018/0046169 | A1* | 2/2018 | Shimamura | G06T 7/70 |
| 2019/0039247 | A1* | 2/2019 | Katagiri | G05B 19/402 |

FOREIGN PATENT DOCUMENTS

| | | | |
|---|---|---|---|
| CN | 107696029 | | 2/2018 |
| EP | 2653414 | | 10/2013 |
| EP | 3282220 | | 2/2018 |
| JP | H1145374 | | 2/1999 |
| JP | 2004072784 | | 3/2004 |
| JP | 2009157913 | | 7/2009 |
| JP | 2009157913 | A * | 7/2009 |
| JP | 2018024044 | | 2/2018 |

OTHER PUBLICATIONS

"International Search Report (Form PCT/ISA/210) of PCT/JP2020/003898," dated Apr. 7, 2020, with English translation thereof, pp. 1-4.

"Written Opinion of the International Searching Authority (Form PCT/ISA/237) of PCT/ JP2020/003898," dated Apr. 7, 2020, with English translation thereof, pp. 1-6.

"Search Report of Europe Counterpart Application", dated Oct. 17, 2022, p. 1-p. 7.

Office Action of China Counterpart Application, with English translation thereof, dated Dec. 7, 2023, pp. 1-21.

* cited by examiner

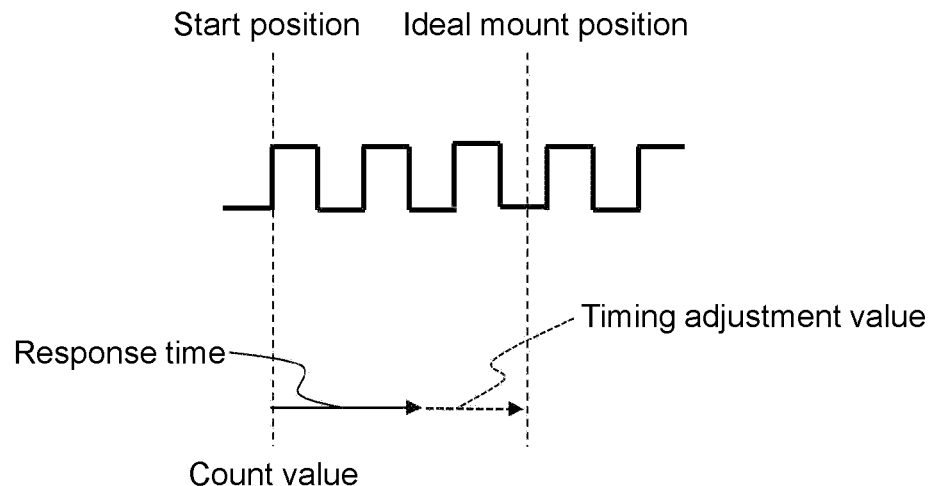
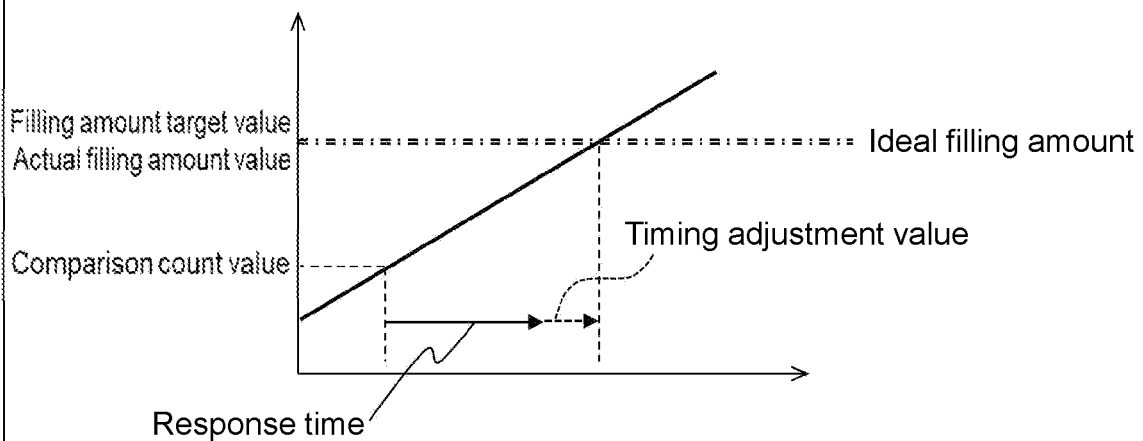
FIG. 4

(A) PLC direct connection bus
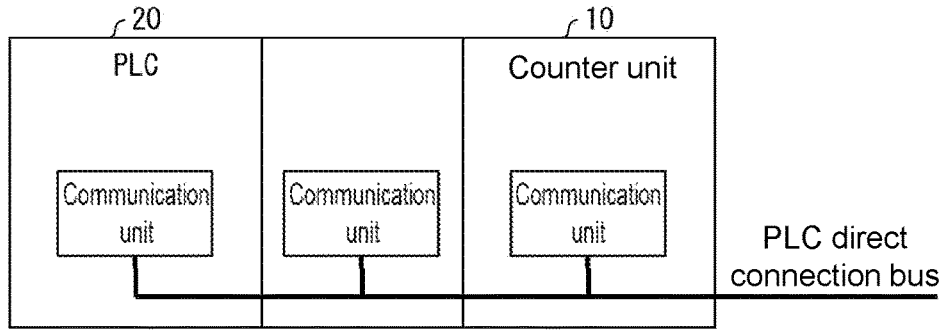
(B) Field network
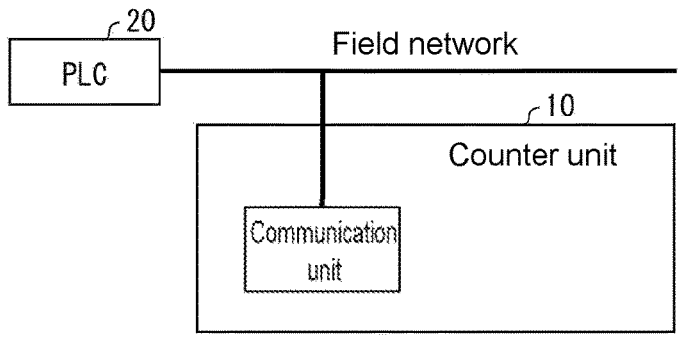
(C) Internal bus of IO terminal
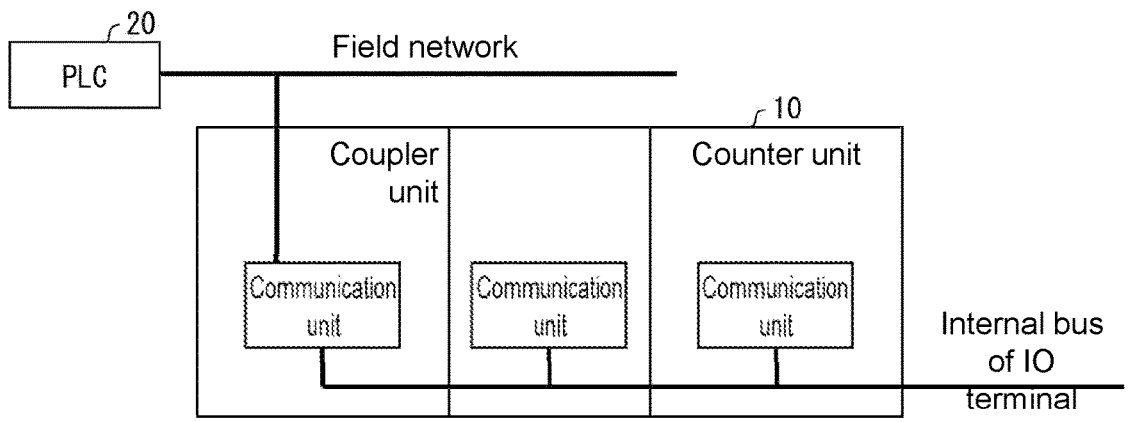
FIG. 5

(A) Encoder

Resolution (pulse/revolution): 10, 20, 30, 40, 50, 60, 100, 200, 300, 360, 400, 500, 600, 720, 800, 1,000, 1,024, 1,200, 1,500, 1,800, 2,000

For example, in case of 720 resolution of 300 rpm (five revolutions per second), 720 x 5 = 3,600 pulses per second = 3,600 Hz
PULSE CYCLE IS 1 / 3,600 = 278 μs In case where resolution of timing adjustment is desired to be increased more than this at same speed, it is necessary to use encoder with high resolution = cost high

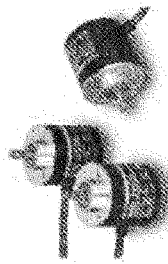

(B) Flowmeter

For example, in case of 3,000 Hz which is half of maximum 6,000 Hz,

Pulse cycle is 1 / 3,000 = 333 μs

Generally pulse lower than encoder.
In case of timing adjustment is desired to be performed with high accuracy, flowmeter with high resolution is required as with encoder.

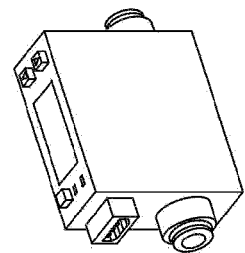

FIG. 8

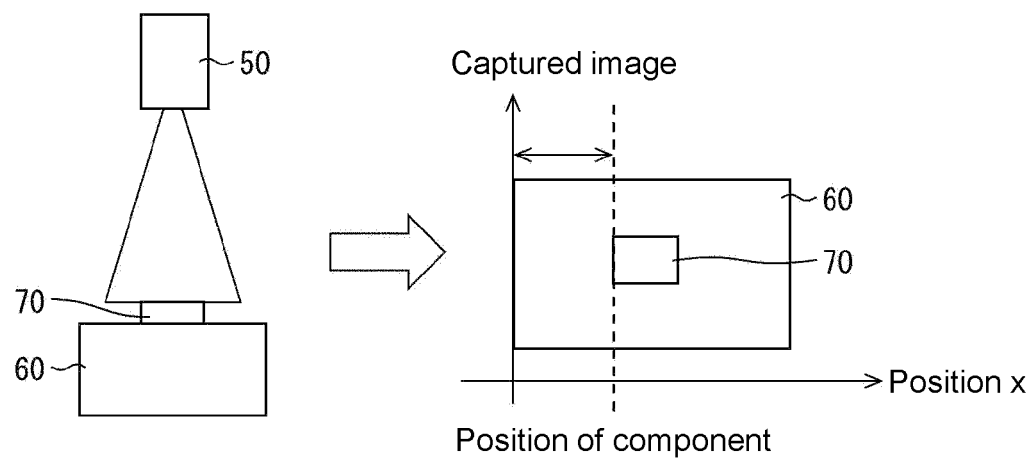
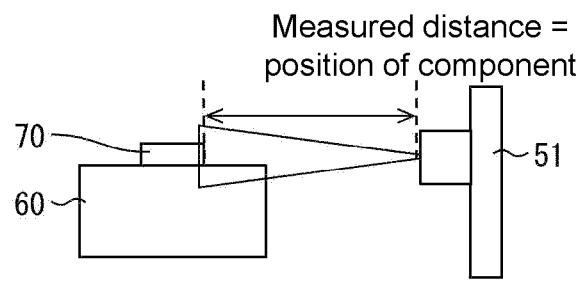
FIG. 10

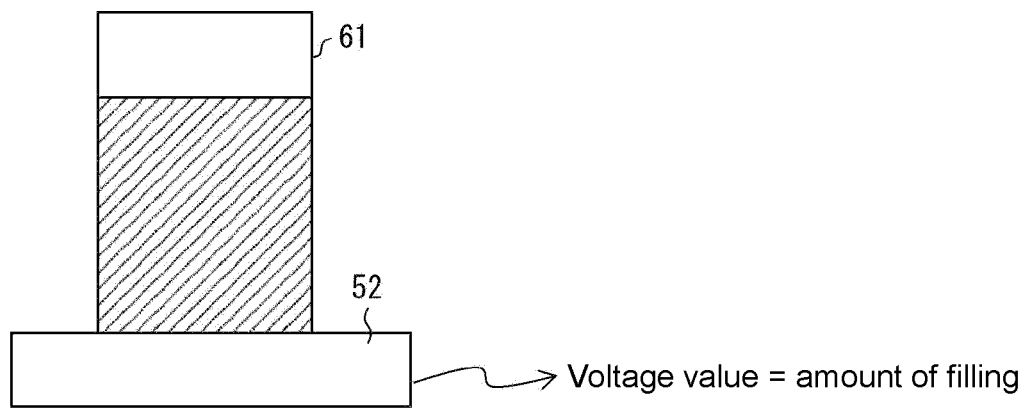
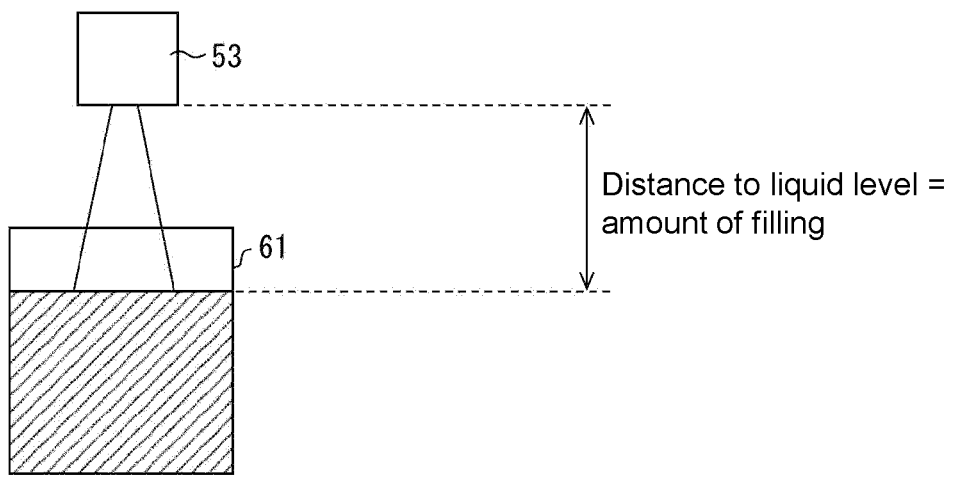
FIG. 11

COUNTER UNIT, COUNTER UNIT CONTROL METHOD, CONTROL DEVICE, AND CONTROL SYSTEM

CROSS-REFERENCE TO RELATED APPLICATION

This application is a 371 application of the International PCT application serial no. PCT/JP2020/003898, filed on Feb. 3, 2020, which claims the priority benefit of Japan Patent Application No. 2019-042978, filed on Mar. 8, 2019. The entirety of each of the above-mentioned patent applications is hereby incorporated by reference herein and made a part of this specification.

TECHNICAL FIELD

The present invention relates to a counter unit or the like that outputs an operation instruction to an actuator when it is determined that the position, cumulative amount, or the like of a workpiece satisfies predetermined conditions.

BACKGROUND ART

Since the past, the adjustment of a timing at which a counter unit causes an actuator to execute a predetermined operation in a production field such as a factory has been known. For example, the following Patent Literature 1 discloses a technique for a counter unit that quantitatively extracts a liquid using a pulse signal from a flow rate sensor to correct a set number of pulses which is a reference corresponding to quantitative extraction in response to a change in cycle length of the pulse signal.

CITATION LIST

Patent Literature

[Patent Literature 1]
Japanese Patent Laid-Open No. 11-45374

SUMMARY

Technical Problem

However, the counter unit of the related art as described above has the following problems because the timing of an output to an actuator is adjusted by increasing or decreasing a target value to be compared with an actual measurement value measured by using the number of pulses (that is, count value) of a pulse signal. That is, the counter unit of the related art that adjusts the timing of an output by increasing or decreasing the target value has a problem in that an adjustable timing width cannot be made smaller than the cycle of the pulse signal, and a long cycle of the pulse signal causes a large timing error. In addition, in a case where the cycle of the pulse signal changes and the same timing of an output is attempted to be maintained before and after the change in cycle, the counter unit of the related art has a problem in that it is necessary to increase or decrease the target value to be compared with the actual measurement value, which leads to low user convenience. Hereinafter, the details of the counter unit of the related art will be described with reference to FIGS. 12 and 13.

Example of Related Art Related to Mount Application

FIG. 12 is a diagram illustrating processing executed by a counter unit 98 or the like which is a counter unit of the related art for processing in which an actuator 40 attaches (mounts) a component (a mount member 70) to a workpiece 60 (hereinafter also referred to as a "mount application"). In (A), (B), and (C) of FIG. 12, the workpiece 60 is assumed to be placed on a conveyor and to move at a constant speed from the left side of the page to the right side of the page.

As shown in (A) of FIG. 12, the counter unit 98 ascertains the position (actual measurement value) of the workpiece 60 using a pulse signal from an encoder 30, that is, using a count value. When it is determined that "the workpiece 60 has reached a start position (target value)," the counter unit 98 executes an output (comparison match output) to the actuator 40 that grips the mount member 70.

As shown in (B) of FIG. 12, the actuator 40 that has received the output from the counter unit 98 attaches the mount member 70 to the workpiece 60. The workpiece 60 to which the mount member 70 is attached by the actuator 40 further moves at a constant speed from the left side of the page to the right side of the page as shown in (C) of FIG. 12.

Here, as shown in (D) of FIG. 12, a response time is required from a point in time when the counter unit 98 determines that "the workpiece 60 has reached a start position" to a point in time when the mount member 70 is attached to the workpiece 60 by the actuator 40. The response time is a time including a "time required for a circuit response" and a "time required for a mechanical response," and can be regarded as constant. That is, the time required for the circuit response is needed after it is determined that "the position of the workpiece 60 matches a start position" and before the actuator 40 accepts the output executed by the counter unit 98 at a point in time when "match" is determined. In addition, the time required for the mechanical response is needed after the actuator 40 receives the output from the counter unit 98 and before the actuator 40 executes a process corresponding to the output from the counter unit 98. That is, the time required for the mechanical response is needed after the counter unit 98 executes the output to the actuator 40 and before the mount member 70 is attached to the workpiece 60 by the actuator 40.

In (D) of FIG. 12, the term "mount position" refers to the position of the workpiece 60 at a point in time when the response time has elapsed from a point in time when it was determined that "the workpiece 60 has reached a start position," and to the position of the workpiece 60 at a point in time when the mount member 70 is attached.

Here, in a case where the actual position of the workpiece 60 at a point in time when the mount member 70 is attached is located closer to the right side of the page than the ideal position of the workpiece 60 at a point in time the mount member 70 is attached, the counter unit 98 executes the following processes. That is, when the workpiece 60 reaches a position where the original start position is shifted to the left side of the page, the counter unit 98 executes the output to the actuator 40, and causes the actuator 40 to attach the mount member 70 to the workpiece 60. By executing the output when the workpiece 60 reaches the position where the original start position is shifted to the left side of the page, the counter unit 98 can shift the position of the workpiece 60 at a point in time when the mount member 70 is attached closer to the left side of the page than the original mount position.

In a case where a position tracing back to a distance equivalent to "one cycle of a pulse signal (that is, one pulse cycle)" from the original start position is defined as a "corrected start position (front)," the counter unit 98 can realize the following state by using the corrected start position (front). That is, by executing the output when the workpiece 60 reaches the corrected start position (front), the counter unit 98 can change the position of the workpiece 60 at a point in time when the mount member 70 is attached to the corrected mount position (front). The "corrected mount position (front)" is the position of the workpiece 60 at a point in time when the response time has elapsed from a point in time when the counter unit 98 determined that "the workpiece 60 has reached the corrected start position (front) ." In a case where the cycle of the pulse signal (pulse cycle) is constant, the "corrected mount position (front)" is a position tracing back to a distance equivalent to "one pulse cycle" from the original mount position.

Similarly, in a case where the actual position of the workpiece 60 at a point in time when the mount member 70 is attached is located closer to the left side of the page than the ideal position of the workpiece 60 at a point in time when the mount member 70 is attached, the counter unit 98 executes the following processes. That is, when the workpiece 60 reaches a position where the original start position is shifted to the right side of the page, the counter unit 98 executes the output to the actuator 40, and causes the actuator 40 to attach the mount member 70 to the workpiece 60. By executing the output when the workpiece 60 reaches the position where the original start position is shifted to the right side of the page, the counter unit 98 can shift the position of the workpiece 60 at a point in time when the mount member 70 is attached closer to the right side of the page than the original mount position.

In a case where a position advanced by a distance equivalent to "one cycle of the pulse signal (that is, one pulse cycle)" from the original start position is defined as a "corrected start position (rear)," the counter unit 98 can realize the following state by using the corrected start position (rear). That is, by executing the output when the workpiece 60 reaches the corrected start position (rear), the counter unit 98 can change the position of the workpiece 60 at a point in time when the mount member 70 is attached to the corrected mount position (rear). The "corrected mount position (rear)" is the position of the workpiece 60 at a point in time when the response time has elapsed from a point in time when the counter unit 98 determined that "the workpiece 60 has reached the corrected start position (rear)." In a case where the cycle of the pulse signal (pulse cycle) is constant, the "corrected mount position (rear)" is a position advanced by a distance equivalent to "one pulse cycle" from the original mount position.

Since the response time can be regarded as constant, the position of the workpiece 60 at a point in time when the mount member 70 is attached relies on a timing at which the counter unit 98 executes a predetermined output to the actuator 40. The counter unit 98 adjusts the position of the workpiece 60 at a point in time when the mount member 70 is attached, that is, the timing of an output, by changing the start position (target value) to be compared with the position (actual measurement value) of the workpiece.

Here, the movement distance of the workpiece 60 equivalent to "one cycle of the pulse signal (that is, one pulse cycle)" is constant. Therefore, the counter unit 98 that adjusts the timing of an output (=the position of the workpiece 60 at a point in time when the mount member 70 is attached) according to the start position can adjust the position of the workpiece 60 only by an integer multiple of a distance equivalent to "one pulse cycle."

That is, the counter unit 98 that adjusts the timing of an output by changing the target value cannot make an adjustable timing width smaller than the cycle of the pulse signal, and a long cycle of the pulse signal causes a large timing error. In addition, in a case where the cycle of the pulse signal changes and the same timing of an output is attempted to be maintained before and after the change in cycle, the counter unit 98 requires a change in the target value to be compared with the actual measurement value, which leads to low user convenience.

Example of Related Art Related to Liquid Filling Application

FIG. 13 is a diagram illustrating a related art for a process of filling a liquid into a workpiece (hereinafter also referred to as a "liquid filling application"). As shown in (A) of FIG. 13, the counter unit 98 ascertains the amount of filling (actual measurement value) of a liquid filled into a workpiece using a pulse signal from a flowmeter 31 (pulse signal generation device), that is, using a count value.

When it is determined that "the amount of a liquid filled into the workpiece (the amount of filling, actual measurement value) has reached the amount of valve closing operation start (target value)," the counter unit 98 executes an output (comparison match output) to a valve 41 (actuator). That is, when it is determined that "the count value matches the comparison count value which is set in association with the amount of valve closing operation start," the counter unit 98 executes the output to the valve 41, closes the valve 41, and stops filling a liquid into the workpiece.

Here, as shown in (B) of FIG. 13, a response time is required from a point in time when the counter unit 98 determines that "the amount of filling has reached the amount of valve closing operation start" to a point in time when the valve 41 is closed and the filling is stopped. The response time is a time including a "time required for the circuit response" and a "time required for the mechanical response," and can be regarded as constant. That is, the time required for the circuit response is needed after it is determined that "the count value and the comparison count value match" and before the valve 41 accepts the output executed by the counter unit 98 at a point in time when "match" is determined. In addition, the time required for the mechanical response is needed after the valve 41 receives the output from the counter unit 98 and before the valve 41 executes a process corresponding to the output from the counter unit 98. That is, the time required for the mechanical response is needed after the counter unit 98 executes the output to the valve 41 and before the valve 41 is closed and the filling is stopped.

In (B) of FIG. 13, the amount of filling into the workpiece at a point in time when the response time has elapsed from a point in time when it was determined that "the count value matches the comparison count value" is referred to as the "actual filling amount value" in the sense of the actual value for the amount of filling. The actual filling amount value can also be understood as the actual amount of filling at a point in time when the valve 41 is closed and the filling is stopped. In addition, the "filling amount target value" indicates a predetermined ideal amount of filling into the workpiece at a point in time when the valve 41 is closed and the filling is stopped.

As shown in (B) of FIG. 13, in a case where the actual filling amount value is larger than the filling amount target value, that is, the amount of filling is excessively large, the counter unit 98 reduces the actual filling amount value by reducing the comparison count value.

However, the "resolution that makes it possible to adjust the amount of filling" in the counter unit 98 is a flow rate for one pulse cycle at the maximum, that is, the counter unit 98 can adjust the actual filling amount value only by an integer multiple of a flow rate equivalent to "one pulse cycle." As a result, as shown in (B) of FIG. 13, there may be concern that the counter unit 98 can obtain only the amount of filling less than the filling amount target value by reducing the comparison count value (the actual filling amount value is insufficient for the filling amount target value).

Since the response time can be regarded as constant, the amount of filling into a workpiece at a point in time when the valve 41 is closed relies on a timing at which the counter unit 98 executes a predetermined output to the valve 41. The counter unit 98 adjusts the actual filling amount value, that is, the timing of an output by changing the amount of valve closing operation start (target value) to be compared with the amount of filling (actual measurement value) into the workpiece.

Here, the amount of filling into the workpiece equivalent to "one cycle of the pulse signal (that is, one pulse cycle)" is constant. Therefore, the counter unit 98 that adjusts the timing of an output (=actual filling amount value) according to the amount of valve closing operation start (target value) can adjust the actual filling amount value only by an integer multiple of the amount of filling equivalent to "one pulse cycle."

That is, the counter unit 98 that adjusts the timing of an output by changing the target value cannot make an adjustable timing width smaller than the cycle of the pulse signal, and thus a long cycle of the pulse signal causes a large timing error. In addition, in a case where the cycle of the pulse signal changes and the same timing of an output is attempted to be maintained before and after the change in cycle, the counter unit 98 requires a change in the target value to be compared with the actual measurement value, which leads to low user convenience.

The counter unit of the related art of which the details have been described with reference to FIGS. 12 and 13 can be arranged as follows. That is, generally, when it is determined that the actual measurement value measured by using the count value (the number of pulses of the pulse signal) matches the target value, the counter unit controls an actuator such as a valve, that is, executes a predetermined output to the actuator.

A response time is required from a point in time when the counter unit determines that "the actual measurement value and the target value match" to a point in time when an output from the counter unit to the actuator realizes the state of the workpiece corresponding to the output. That is, a timing error occurs by a total time (response time) of "the time required for the circuit response" and "the time required for the mechanical response" after it is determined that "the actual measurement value and the target value match" and before the workpiece enters a desired state. The "response time" is sometimes represented as a "delay time."

The counter unit of the related art cancels out the influence of a timing error by increasing or decreasing the target value to be compared with the actual measurement value (that is, to determine a match with the actual measurement value). However, the target value can be increased or decreased only by an integer multiple of the movement distance and the amount of filling equivalent to "one pulse cycle," that is, the counter unit of the related art has a problem in that the resolution related to the adjustment of the output timing is a pulse cycle. Therefore, particularly in a case where the pulse cycle is long, the counter unit of the related art cannot precisely adjust the output timing, and thus a timing error becomes large. In addition, the response time is constant regardless of the pulse cycle, and thus in a case where the pulse cycle changes, the counter unit of the related art has a problem in that the output timing cannot be maintained unless the target value is increased or decreased according to the changing pulse cycle, which leads to low user convenience.

An aspect of the present invention was contrived in view of these problems, and an objective thereof is to realize a counter unit or the like capable of adjusting a timing of an output to an actuator to be executed when it is determined that an actual measurement value measured by using the number of pulses of a pulse signal and a target value match without relying on the cycle of the pulse signal.

Solution to Problem

In order to solve the above problem, according to an aspect of the present invention, there is provided a counter unit including: a measurement unit that counts the number of pulses of a pulse signal and measures an actual measurement value; a comparison unit that determines a match between the actual measurement value measured by the measurement unit and a target value; and an output unit that executes an output to an actuator when the comparison unit determines that the actual measurement value and the target value match, wherein the output unit includes an output delay unit that adjusts a timing of the output from a point in time when the comparison unit determines that the actual measurement value and the target value match to a point in time when a time independent of a cycle of the pulse signal indicated by a timing adjustment value has elapsed.

In order to solve the above problem, according to an aspect of the present invention, there is provided a counter unit control method including: a measurement step of counting the number of pulses of a pulse signal and measuring an actual measurement value; a comparison step of determining a match between the actual measurement value measured in the measurement step and a target value; and an output step of executing an output to an actuator when it is determined in the comparison step that the actual measurement value and the target value match, wherein the output step includes an output delay step of adjusting a timing of the output from a point in time when it is determined in the comparison step that the actual measurement value and the target value match to a point in time when a time independent of a cycle of the pulse signal indicated by a timing adjustment value has elapsed.

Advantageous Effects of Invention

According to an aspect of the present invention, the counter unit has an effect that the timing of an output to the actuator can be adjusted without relying on the cycle of the pulse signal.

BRIEF DESCRIPTION OF THE DRAWINGS

FIG. 4 is a diagram illustrating a timing adjustment value which is set by the counter unit of FIG. 1.

FIG. 5 is a diagram illustrating an example of connection between the counter unit of FIG. 1 and a PLC of FIG. 1.

FIG. 8 is a diagram illustrating performance or the like of devices included in the control system of FIG. 2 other than the devices shown in FIG. 7.

FIG. 10 is a diagram illustrating a specific example of a method of detecting an actual mount position for the mount application.

FIG. 11 is a diagram illustrating a specific example of a method of detecting an actual amount of filling for a liquid filling application.

DESCRIPTION OF THE EMBODIMENTS

Embodiment 1

Figure 1:
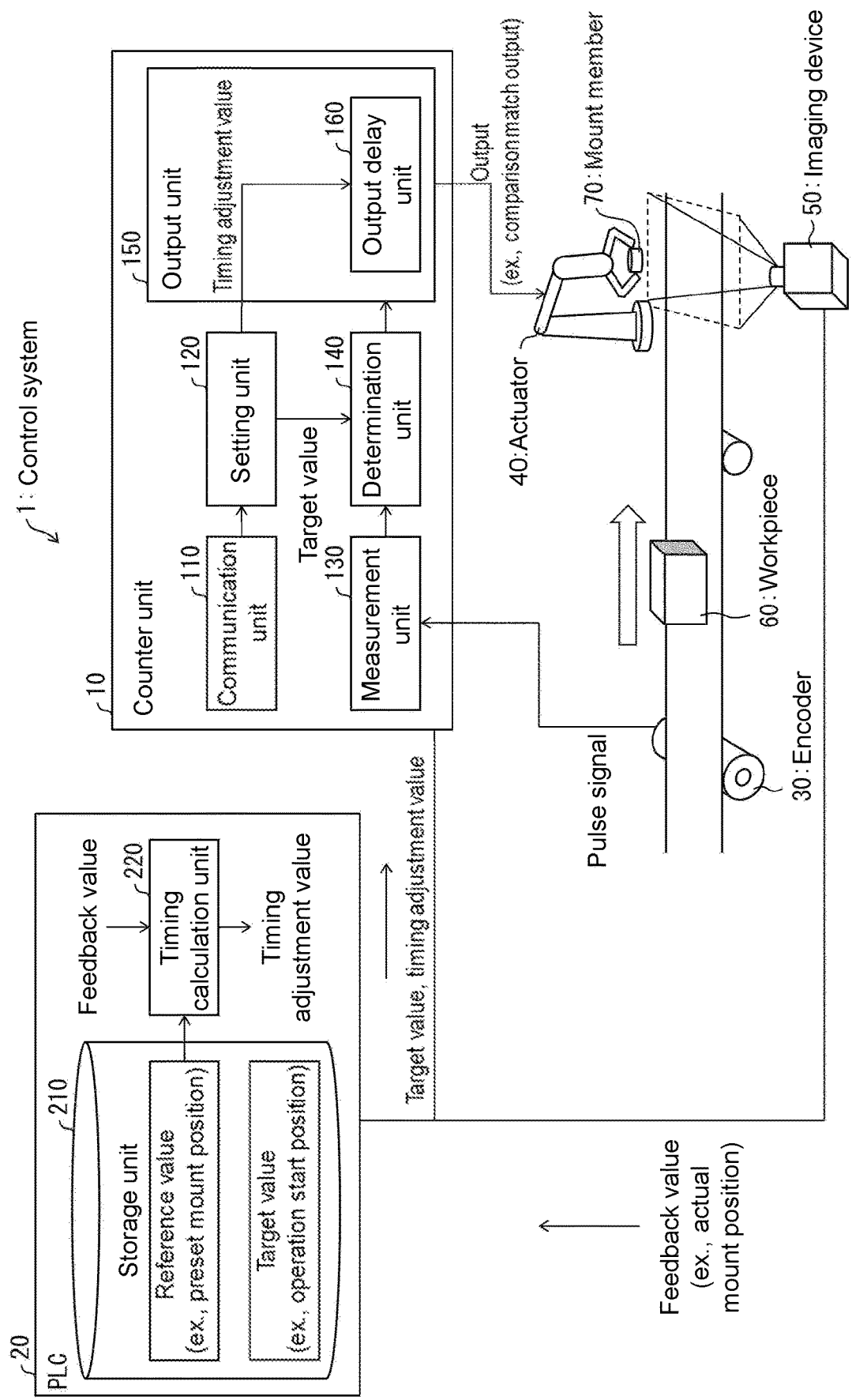
FIG. 1 is a block diagram illustrating main components of a counter unit or the like according to Embodiment 1 of the present invention.

Hereinafter, an embodiment according to an aspect of the present invention (hereinafter also denoted as "the present embodiment") will be described with reference to FIGS. 1 to 13. Meanwhile, the same or equivalent portions in the drawings are denoted by the same reference numerals and signs, and thus description thereof will not be repeated. In the present embodiment, for example, a counter unit 10 will be described as a typical example of a counter unit. In order to facilitate understanding of the counter unit 10 according to an aspect of the present invention, first, an outline of a control system 1 including the counter unit 10 will be described with reference to FIG. 2.

1. Application Example (Overview of Control System)

Figure 2:
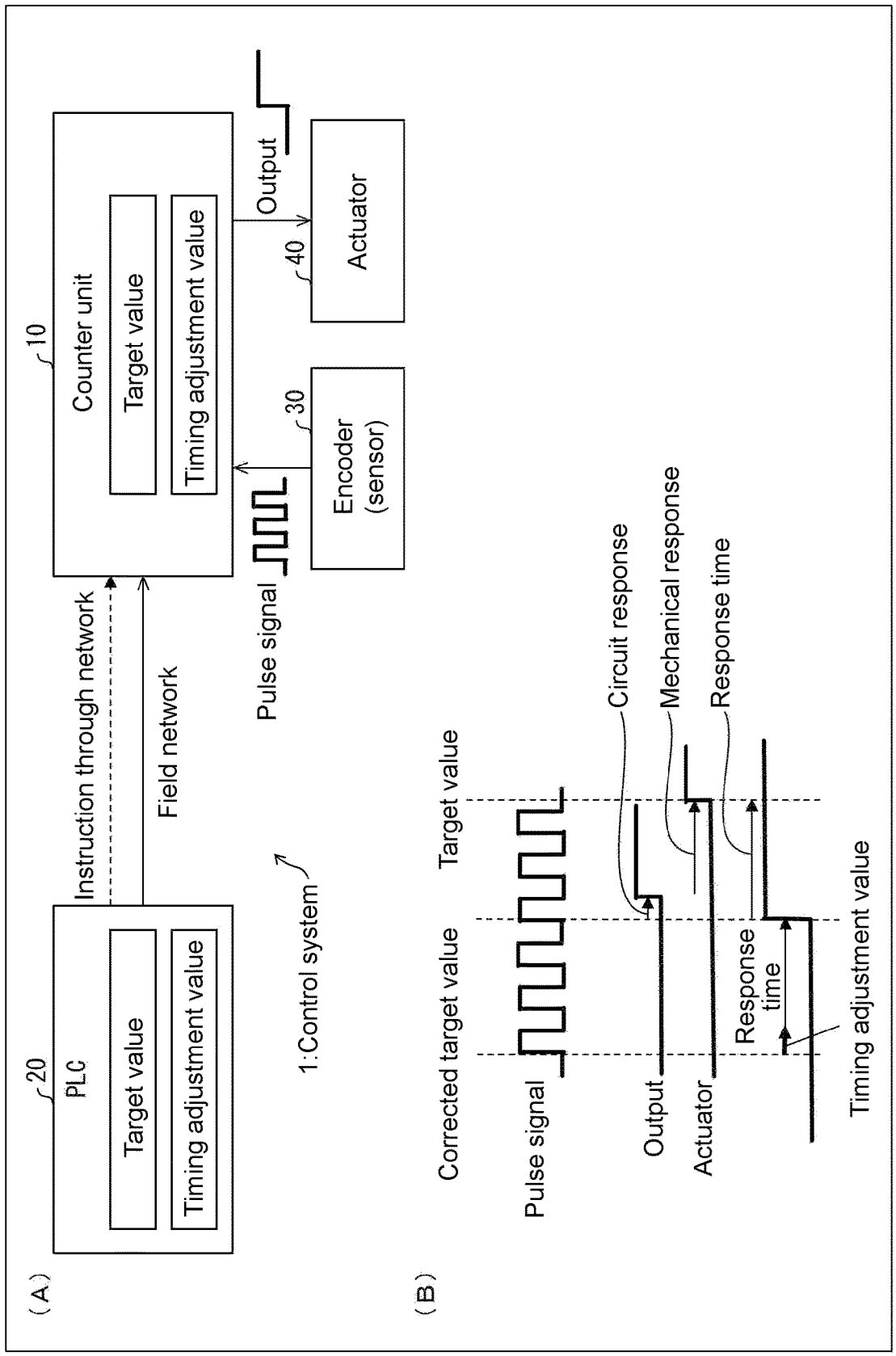
FIG. 2 is a diagram illustrating of an overview of a control system including the counter unit of FIG. 1.

FIG. 2 is a diagram illustrating an overview of the control system 1 including the counter unit 10. As shown in (A) of FIG. 2, the control system 1 includes the counter unit 10 and a programmable logic controller (PLC) 20 which is a control device (controller). As shown in (A) of FIG. 2, the control system 1 may further include a sensor that generates a pulse signal (a pulse signal generation device) such as an encoder 30 and an actuator 40.

The counter unit 10 is communicably connected to the PLC 20 through, for example, a field network, and transmits and receives data to and from the PLC 20 for each constant communication cycle, specifically, for each control cycle of the PLC 20. For example, the counter unit 10 receives a target value and a timing adjustment value Ta from the PLC 20 for each control cycle of the PLC 20, and transmits information indicating the position of a workpiece 60 ascertained using a count value to the PLC 20 for each control cycle of the PLC 20.

In addition, the counter unit 10 is communicably connected to the encoder 30 and the actuator 40. The counter unit 10 accepts a pulse signal (pulse wave) generated by the encoder 30 as an input from the encoder 30, and counts the number of pulses of the accepted pulse signal, that is, uses the count value to measure the state of a workpiece or the like. The counter unit 10 calculates, for example, the movement distance of a conveyor from the pulse signal from the encoder 30 attached to the conveyor, that is, ascertains the position of the workpiece on the conveyor. In the following description, the "state of the workpiece or the like (such as, for example, the position, size, or weight of the workpiece or the like)" measured by the counter unit 10 counting the number of pulses of the pulse signal is also referred to as an "actual measurement value."

When the movement distance of the conveyor, that is, the position of the workpiece 60, matches the target value received from the PLC 20, the counter unit 10 executes the following processes. That is, the counter unit 10 waits for a time indicated by the timing adjustment value Ta received from the PLC 20 from a point in time when it is determined that the position of the workpiece 60 matches the target value, and then outputs a predetermined signal to the actuator 40. In the following description, the output of a predetermined signal to the actuator 40 which is executed by the counter unit 10 that determines that the actual measurement value and the target value match is also referred to as a "comparison match output." When it is determined that the actual measurement value and the target value match, the counter unit 10 outputs, for example, a signal indicating that the position of the workpiece 60 matches the target value to the actuator 40.

By outputting a predetermined signal to the actuator 40, the counter unit 10 causes the actuator 40 to execute a predetermined process (operation), that is, a process corresponding to the predetermined signal. Particularly, the counter unit 10 adjusts a timing at which the actuator 40 executes a predetermined process by adjusting the timing of an output to the actuator 40, that is, changes the state of the workpiece to a desired state at a desired timing.

The PLC 20 is a control device (a controller) that controls the entirety of the control system 1, and is communicably connected to the counter unit 10. For example, a display unit and an operation unit (which are not shown) may be connected to the PLC 20. The display unit is constituted by a liquid crystal panel or the like capable of displaying an image, and the operation unit is typically constituted by a touch panel, a keyboard, a mouse, or the like.

The PLC 20 transmits the target value and the timing adjustment value Ta to the counter unit 10 so that the actuator 40 performs a predetermined process at a predetermined timing, and particularly transmits the target value and the timing adjustment value Ta to the counter unit 10 for each constant communication cycle.

The encoder 30 is attached to, for example, a conveyor to generate a pulse signal in accordance with the amount of movement of the conveyor, that is, in accordance with the amount of movement of the workpiece 60. The encoder 30 outputs a pulse wave to the counter unit 10 every time the conveyor (that is, the workpiece 60) moves a predetermined amount.

The actuator 40 is connected to the counter unit 10. When an output from the counter unit 10 is accepted, the actuator 40 executes a predetermined operation (for example, an operation of attaching a component gripped by the actuator 40 to the workpiece 60).

That is, as shown in (B) of FIG. 2, a time required for a circuit response is needed after it is determined that "the actual measurement value and the target value match" and before the actuator 40 accepts an output executed by the counter unit 10 at a point in time when "match" is determined. That is, the point in time when the actuator 40 can receive an output from the counter unit 10 is a point in time after a point in time when the time required for the circuit response has elapsed from the point in time when the counter unit 10 determined that "the actual measurement value and the target value match."

In addition, a time required for a mechanical response is needed between a point in time when the actuator 40 executes a process corresponding to the output from the counter unit 10 and a point in time when the actuator 40 receives the output from the counter unit 10. That is, a point in time when the actuator 40 can execute the process corresponding to the output from the counter unit 10 is a point in time after a point in time when the time required for the mechanical response has elapsed from the point in time when the actuator 40 received the output from the counter unit 10.

Therefore, the point in time when the actuator 40 can execute the process corresponding to the output from the counter unit 10 is, at the earliest, a point in time when a "response time" in (B) of FIG. 2 has elapsed from the point in time when the counter unit 10 determined that "the actual measurement value and the target value match." The "response time" in (B) of FIG. 2 is a total value of "the time required for the circuit response" and "the time required for the mechanical response," and is also referred to as a "delay."

That is, when it is determined that "the actual measurement value and the target value match" and then the output to the actuator 40 is executed, the counter unit 10 cannot cause the actuator 40 to execute a predetermined process at a point in time of the target value (=a point in time when the actual measurement value matches the target value).

Consequently, in order to cause the actuator 40 to execute a predetermined process at a point in time of the target value, the control system 1 changes a value determined to match the actual measurement value to a "corrected target value," and causes the counter unit 10 to execute a standby process using the "timing adjustment value Ta."

That is, when it is determined that "the actual measurement value and the corrected target value match," the counter unit 10 waits for a time indicated by the timing adjustment value Ta, and then executes the output to the actuator 40. That is, the counter unit 10 executes the output to the actuator 40 at a point in time when the time indicated by the timing adjustment value Ta has elapsed from the point in time when it was determined that "the actual measurement value and the corrected target value match."

Thereby, the point in time when the actuator 40 receives the output from the counter unit 10 is a point in time when a total time of the time indicated by the timing adjustment value Ta and the time required for the circuit response has elapsed from a point in time when it was determined that "the actual measurement value and the corrected target value match." Further, the point in time when the actuator 40 executes the process corresponding to the output from the counter unit 10 is a point in time when the time required for the mechanical response has elapsed from the point in time when the actuator 40 received the output from the counter unit 10.

Therefore, the actuator 40 executes a predetermined process at a point in time when a total time of the time indicated by the timing adjustment value Ta and the response time has elapsed from the point in time when the counter unit 10 determined that "the actual measurement value and the corrected target value match." That is, as shown in (B) of FIG. 2, the actuator 40 executes the predetermined process at a point in time of the target value.

As described above, the control system 1 can adjust the timing of execution of the comparison match output of the counter unit 10 through constant cycle communication (cyclic communication) between the counter unit 10 and the PLC 20. That is, the counter unit 10 adjusts the timing of execution of the comparison match output to the actuator 40 by using the target value (corrected target value) periodically received from the PLC 20 and the timing adjustment value Ta. Specifically, the counter unit 10 sets the point in time when the time indicated by the timing adjustment value Ta has elapsed from the point in time when it was determined that the actual measurement value measured by using a pulse signal matches the target value (corrected target value) as the timing of execution of the comparison match output.

Figure 12:
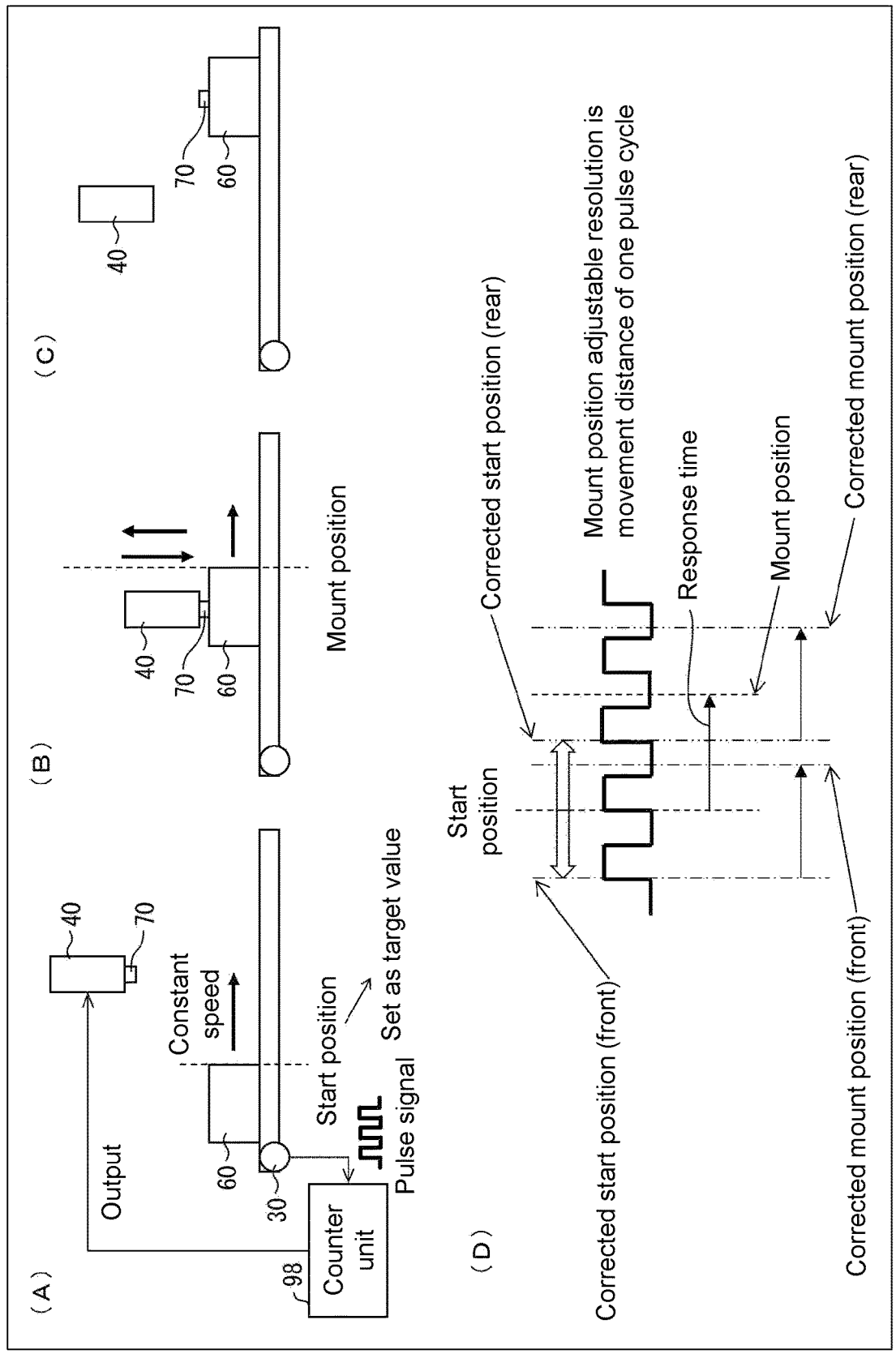
FIG. 12 is a diagram illustrating a related art for a process of mounting a component on a workpiece (mount application).
Figure 13:
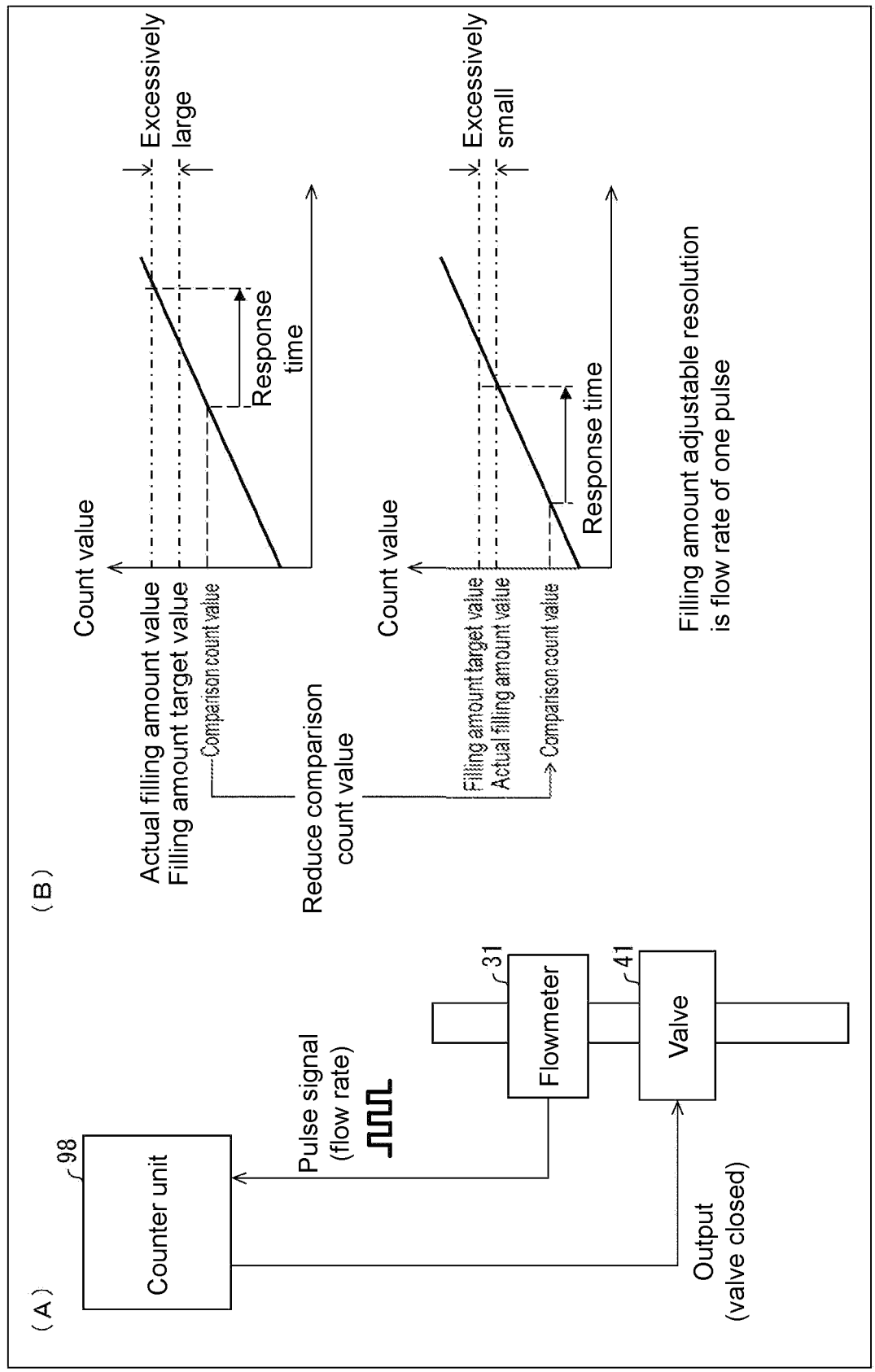
FIG. 13 is a diagram illustrating a related art for a process of filling a liquid into a workpiece (liquid filling application).

Here, the counter unit of the related art shown in FIGS. 12 and 13 adjusts the timing of execution of the comparison match output using only the target value to be compared with actual measurement value (that is, determined to match the actual measurement value) without using the timing adjustment value Ta. The target value can be increased or decreased only by an integer multiple of the actual measurement value (movement distance or amount of filling) equivalent to "one pulse cycle Tp (one cycle of the pulse signal)." Therefore, in the counter unit of the related art, the resolution related to the adjustment of the timing of execution of the comparison match output is the pulse cycle Tp.

On the other hand, the counter unit 10 adjusts the timing of execution of the comparison match output using the timing adjustment value Ta received from the PLC 20 in addition to the target value. The timing adjustment value Ta is irrelevant to the cycle Tp of the pulse signal. Therefore, the counter unit 10 can adjust a comparison match output timing without relying on the cycle Tp of the pulse signal, that is, independently of the cycle Tp of the pulse signal, and thus the comparison match output timing can be controlled with a high degree of accuracy.

Here, in the control system 1 described with reference to FIG. 2, the counter unit 10 executes the output to the actuator 40 when it is determined that the position (actual measurement value) of the workpiece measured by using the pulse signal from the encoder 30 matches a predetermined position (target value).

However, the state of the workpiece measured by the counter unit 10 using the pulse signal is not limited to the position of the workpiece. The counter unit 10 may measure the amount of filling (actual measurement value) of a liquid to be filled into the workpiece using, for example, a pulse signal from a flowmeter which is a pulse signal generation device. When it is determined that the amount of filling into the workpiece measured by using the pulse signal matches a predetermined amount of filling (the amount of filling corresponding to the target value), the counter unit 10 may output a predetermined signal to the actuator 40 such as a valve that fills the workpiece with a liquid.

For example, a flowmeter that outputs a pulse output signal proportional to the flow rate of a liquid in a pipeline is disposed between a pipe that is a flow channel in which the liquid flows and a valve (actuator) which is connected to the pipe and capable of controlling the filling speed of the liquid for filling. The counter unit 10 counts the number of pulses of the pulse signal from the flowmeter, and measures the amount of filling (actual measurement value) into the workpiece which is a container to be filled for receiving a liquid controlled by opening and closing the valve. When it is determined that the amount of filling into the workpiece matches the predetermined amount of filling (the amount of filling corresponding to the target value), the counter unit 10 outputs a predetermined signal to the valve to close the valve, and stops filling the workpiece with a liquid. Particularly, when it is determined that the amount of filling into the workpiece matches the predetermined amount of filling, the counter unit sets a point in time when the time indicated by the timing adjustment value Ta has elapsed from that point in time as the timing of execution of the comparison match output to the valve.

2. Configuration Example

The details of the control system 1 of which the outline has been described so far with reference to FIG. 2 will be described below. The outline of the control system 1 (particularly, the counter unit 10 and the PLC 20) of which the details will be described with reference to FIG. 1 or the like is as follows.

That is, the counter unit 10 includes a measurement unit 130 that counts the number of pulses of the pulse signal and measures an actual measurement value, a determination unit 140 (a comparison unit) that determines a match between the actual measurement value measured by the measurement unit 130 and a target value, and an output unit 150 that executes an output (comparison match output) to the actuator 40 when the determination unit 140 determines that the actual measurement value and the target value match. The output unit 150 includes an output delay unit 160 that adjusts a timing of the output from a point in time when the determination unit 140 determines that the actual measurement value and the target value match to a point in time when a time independent of the cycle Tp of the pulse signal which is indicated by the timing adjustment value Ta has elapsed.

According to the above configuration, the counter unit 10 accepts the pulse signal as an input from a pulse signal generation device that generates the pulse signal in accordance with the amount of detection such as, for example, the encoder 30 or a flowmeter, and measures the actual measurement value from the accepted pulse signal. When it is determined that the actual measurement value and the target value match, the counter unit 10 executes the output at a point in time when the time independent of the cycle Tp of the pulse signal which is indicated by the timing adjustment value Ta has elapsed from the point in time when it was determined that they match.

In the related art, there is a known technique of, when it is determined that the actual measurement value measured by counting the number of pulses of the pulse signal and the target value match, adjusting the timing of the output of the counter unit that executes the output by increasing or decreasing the target value.

Here, the target value can be increased or decreased only by an integer multiple of the actual measurement value equivalent to "the cycle of the pulse signal (the pulse cycle Tp)." Therefore, in the counter unit of the related art that adjusts the timing of an output using only the target value, the resolution related to the adjustment of the output timing is limited to the pulse cycle Tp. Particularly, in a case where the pulse cycle Tp is long, the counter unit of the related art cannot precisely adjust the output timing, and thus a timing error becomes large. In addition, the response time is constant regardless of the pulse cycle Tp, and thus in a case where the pulse cycle Tp changes, the counter unit of the related art cannot maintain the output timing unless the target value is increased or decreased according to the changing pulse cycle Tp, which leads to low user convenience.

In contrast to such a counter unit of the related art, the counter unit 10 adjusts the timing of the output using the timing adjustment value Ta indicating the time (waiting time) independent of the cycle Tp of the pulse signal in addition to the target value. That is, the counter unit 10 adjusts a timing of the output from a point in time when it is determined that the actual measurement value and the target value match to a point in time when the time independent of the cycle Tp of the pulse signal which is indicated by the timing adjustment value Ta has elapsed.

Therefore, the counter unit 10 has an effect that the timing of the output can be adjusted using the timing adjustment value Ta without relying on the cycle Tp of the pulse signal, that is, independently of the cycle Tp of the pulse signal. Particularly, the time indicated by the timing adjustment value Ta is independent of the cycle Tp of the pulse signal, and thus even in a case where the pulse cycle Tp is long, the counter unit 10 can precisely adjust the timing of the output. In addition, even in a case where the pulse cycle Tp changes, the counter unit 10 can easily adjust the timing of the output simply by changing the timing adjustment value Ta by the amount of a change in the pulse cycle Tp, which leads to high user convenience.

In the counter unit 10, the output unit 150 is constituted by a logic circuit based on hardware, and the time indicated by the timing adjustment value Ta is an integer multiple of the clock of the logic circuit.

According to the above configuration, in the counter unit 10, the output unit 150 is constituted by a logic circuit based on hardware. For example, the output unit 150 may be realized using at least one of a field programmable gate array (FPGA), a complex programmable logic device (CPLD), and an application specific integrated circuit (ASIC). In the counter unit 10, the time indicated by the timing adjustment value Ta is an integer multiple of the clock of the logic circuit.

Here, the output unit 150 is realized by a logic circuit based on hardware, and thus the amount of delay can be made smaller than in a case where the output unit 150 is realized by software. That is, the output unit 150 is realized by a logic circuit based on hardware, and thus a smaller value can be set for the time (waiting time) indicated by the timing adjustment value Ta than in the case where the output unit 150 is realized by software. In addition, the output unit 150 is realized by a logic circuit based on hardware, and thus a variation in delay can be suppressed more than in the case where the output unit 150 is realized by software.

Therefore, when it is determined that the actual measurement value and the target value match, the counter unit 10 has an effect that the counter unit can execute the output to the actuator 40 with a smaller waiting time than in the case where the output unit 150 is realized by software. In addition, the counter unit 10 has an effect that a variation in delay can be suppressed more than in the case where the output unit 150 is realized by software.

The counter unit 10 further includes a communication unit 110 that receives the target value and the timing adjustment value Ta from the PLC 20 (control device) that performs an input and output process on ON/OFF data in a predetermined control cycle.

According to the above configuration, the counter unit 10 receives the target value and the timing adjustment value Ta from the PLC 20, and adjusts the timing of the output (comparison match output) using the received target value and timing adjustment value Ta.

Here, a communication system between the counter unit 10 and the PLC 20 is not particularly limited. The counter unit 10 and the PLC 20 are communicably connected to each other through, for example, a field network, and the counter unit 10 may receive the target value and the timing adjustment value Ta from the PLC 20 through the field network. In addition, the counter unit 10 may be formed integrally with the PLC 20, that is, may be communicably connected to the PLC 20 through an internal bus. In that case, the counter unit 10 may receive the target value and the timing adjustment value Ta from the PLC 20 through the internal bus.

For example, the counter unit 10 repeatedly receives the target value and the timing adjustment value Ta from the PLC 20 for each control cycle, and adjusts the timing of the output using the received target value and timing adjustment value Ta.

Therefore, the counter unit 10 has an effect that it is possible to compare the actual measurement value measured by the host device with the target value received from the PLC 20, and to adjust the timing of the output using the timing adjustment value Ta received from the PLC 20. That is, a user can adjust the timing of the output using the target value and the timing adjustment value Ta which are (for example, periodically) transmitted by the PLC 20 to the counter unit 10.

The timing adjustment value Ta is a value updated using "a feedback value indicating an actual state of the workpiece 60 or the like realized by the actuator 40 that has accepted the output (comparison match output) from the counter unit 10."

According to the above configuration, the counter unit 10 has an effect that the timing of the output can be adjusted with a high degree of accuracy using the timing adjustment value Ta updated to an appropriate value using the feedback value related to the output to the actuator 40.

The timing adjustment value Ta is a value updated using a difference between "a reference value indicating a predetermined ideal state of the workpiece 60 or the like to be realized by the actuator 40 that has accepted the output" and a value calculated by statistically processing a plurality of the feedback values.

According to the above configuration, the counter unit 10 adjusts the timing of the output using the timing adjustment value Ta updated to an appropriate value using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the counter unit 10 has an effect that, even in a case where the feedback values temporarily indicate abnormal values, the timing of the output can be adjusted with a high degree of accuracy using the timing adjustment value Ta updated to an appropriate value by suppressing the influence of such abnormal values.

Next, the details of the configuration of the counter unit 10 or the like that has been outlined so far will be described with reference to FIG. 1, and then processing which is executed by the counter unit 10 or the like will be described with reference to FIG. 3.

(Details of Counter Unit)

FIG. 1 is a block diagram illustrating main components of the counter unit 10 or the like included in the control system 1. As shown in FIG. 1, the counter unit 10 is a device that adjusts the timing of execution of a predetermined operation to be executed by the actuator, and includes the communication unit 110, a setting unit 120, the measurement unit 130, the determination unit 140, and the output unit 150 as functional blocks.

The communication unit 110 receives the target value and the timing adjustment value Ta from the PLC 20, and particularly repeatedly receives the target value and the timing adjustment value Ta from the PLC 20 for each control cycle of the PLC 20. The communication unit 110 notifies the setting unit 120 of the target value and the timing adjustment value Ta which are received from the PLC 20.

The communication unit 110 is realized using an integrated circuit such as, for example, a communication integrated circuit (IC). Specifically, the communication unit 110 may be realized using at least one of a field programmable gate array (FPGA), a complex programmable logic device (CPLD), and an application specific integrated circuit (ASIC).

The setting unit 120 notifies the determination unit 140 and the output unit 150 of the target value and the timing adjustment value Ta which are received from the PLC 20 by the communication unit 110. Specifically, the setting unit 120 notifies the determination unit 140 of the target value received from the PLC 20 by the communication unit 110, and notifies the output unit 150 of the timing adjustment value Ta received from the PLC 20 by the communication unit 110.

The measurement unit 130 receives a pulse signal generated by a pulse signal generation device such as the encoder 30 from the pulse signal generation device, counts the number of pulses (count value) of the received pulse signal, and measures an actual measurement value such as the position of the workpiece or the amount of filling. The measurement unit 130 notifies the determination unit 140 of the actual measurement value measured by using the pulse signal.

The determination unit 140 determines whether the actual measurement value measured by the measurement unit 130 using the pulse signal matches the target value which is notified of by the setting unit 120 (that is, the target value acquired from the PLC 20). When the determination unit 140 determines that "the actual measurement value matches the target value," it notifies the output unit 150 of the determination result that "the actual measurement value matches the target value."

The setting unit 120 is realized by software using, for example, a central processing unit (CPU) or a micro processor unit (MPU). The measurement unit 130 and the determination unit 140 are realized by hardware, and may be realized using, for example, a counter function or the like inside the MPU, or may be realized using an IC such as an FPGA or an ASIC.

When the determination unit 140 notifies of the determination result that "the actual measurement value matches the target value," the output unit 150 outputs a predetermined signal (for example, a signal indicating that "the actual measurement value matches the target value") to the actuator 40, that is, executes a predetermined output (comparison match output). The output unit 150 executes the comparison match output to thereby cause the actuator 40 to execute a predetermined process (operation) corresponding to the comparison match output.

Particularly, the output unit 150 adjusts a timing at which the actuator 40 executes a predetermined process (operation) by adjusting the timing of execution of the comparison match output, and specifically executes the comparison match output at the following timing. That is, the output unit 150 waits until a time (waiting time) set by the output delay unit 160 has elapsed from a point in time when the determination unit 140 notified of the determination result that "the actual measurement value matches the target value," and executes the comparison match output at a point in time when the waiting time has elapsed. The output unit 150 includes the output delay unit 160 that sets the waiting time.

The output delay unit 160 sets the "waiting time" which is a time interval from a point in time when the output unit 150 notifies of the determination result that "the actual measurement value matches the target value" to a point in time when the output unit 150 executes the comparison match output (output of a predetermined signal to the actuator 40). The output delay unit 160 sets a time indicated by the timing adjustment value Ta notified of by the setting unit 120 (that is, the timing adjustment value Ta acquired from the PLC 20) as the waiting time, and sets, for example, the timing adjustment value Ta as the waiting time.

As described above, the timing adjustment value Ta is a signal (data) which is received from the PLC 20, and is a signal indicating a time which is irrelevant to the cycle of the pulse signal received by the measurement unit 130 from a pulse signal generation device such as the encoder 30, that is, independent of the cycle of the pulse signal. Therefore, the output delay unit 160 can set the waiting time to a time independent of the cycle of the pulse signal using the timing adjustment value Ta.

The output unit 150 may be constituted as hardware by, for example, a logic circuit formed on an integrated circuit (IC chip), or specifically may be realized using at least one of an FPGA, a CPLD, and an ASIC. The output delay unit 160 may be realized using a function inside the MPU (or inside the CPLD) constituting the output unit 150, or may be constituted by hardware such as the FPGA or the ASIC.

In addition, the hardware constituting the output unit 150 is hardware separate from the hardware constituting the communication unit 110, and may also be hardware separate from a CPU (or MPU) that realizes the setting unit 120, the measurement unit 130, and the determination unit 140. That is, the counter unit 10 may include three pieces of hardware, that is, a communication IC (the communication unit 110), a CPU (or MPU) that realizes the setting unit 120, the measurement unit 130, and the determination unit 140, and hardware constituting the output unit 150.

(Details of PLC)

The PLC 20 is a control device that performs an input and output process on ON/OFF data in a predetermined control cycle, and transmits the target value and the timing adjustment value Ta to the counter unit 10, for example, in a predetermined control cycle.

In FIG. 1, the PLC 20 is connected to an imaging device 50 (a state detection device), that is, the control system 1 shown in FIG. 1 includes the counter unit 10, the PLC 20, and the imaging device 50.

The PLC 20 acquires data (captured image data) indicating the actual state of the workpiece 60 realized by the actuator 40 that has accepted the comparison match output from the counter unit 10 from the imaging device 50 as a feedback value related to the comparison match output. Particularly, the PLC 20 repeatedly acquires the captured image data as a feedback value from the imaging device 50 for each control cycle of the PLC 20.

As shown in FIG. 1, the PLC 20 includes a storage unit 210 and a timing calculation unit 220 (update unit) as functional blocks. In addition to each functional block described above, the PLC 20 may include an acquisition unit or the like (not shown) that acquires the captured image data from the imaging device 50. However, in order to ensure the simplicity of the description, components which are not directly related to the present embodiment are omitted from the description and the block diagram. However, according to the actual situation of implementation, the PLC 20 may include the omitted components. The timing calculation unit 220 can be realized, for example, by a central processing unit (CPU) or the like reading out a program stored in a storage device (the storage unit 210) realized by a read only memory (ROM), a non-Volatile random access memory (NVRAM), or the like into a random access memory (RAM) or the like (not shown) and executing the program. Hereinafter, the timing calculation unit 220 in the PLC 20 will be described.

The timing calculation unit 220 specifies "the actual position (feedback value) of the workpiece 60 realized by the actuator 40 that has accepted the comparison match output from the counter unit 10" from the captured image data acquired as the feedback value from the imaging device 50. The timing calculation unit 220 updates the timing adjustment value Ta using information (feedback value) indicating the specified actual position of the workpiece 60.

For example, the timing calculation unit 220 specifies a plurality of feedback values from a plurality of captured image data acquired from the imaging device 50, and calculates an average value of the specified plurality of feedback values. The timing calculation unit 220 updates the timing adjustment value Ta using a difference between the calculated average value and a reference value indicating "a predetermined ideal position (state) of the workpiece 60 to be realized by the actuator 40 that has accepted the comparison match output." The update of the timing adjustment value Ta using the feedback value which is performed by the timing calculation unit 220 will be described in detail later with reference to FIG. 9 or the like.

The PLC 20 transmits the timing adjustment value Ta and the target value which are updated by the timing calculation unit 220 to the counter unit 10. The counter unit 10 executes the comparison match output using the latest timing adjustment value Ta (the timing adjustment value Ta updated by the timing calculation unit 220) which is received from the PLC 20 and the target value.

The storage unit 210 is a storage device that stores various types of data used by the PLC 20. Meanwhile, the storage unit 210 may non-temporarily store (1) a control program executed by the PLC 20, (2) an OS program, (3) an application program for executing various functions of the PLC 20, and (4) various types of data to be read out when the application program is executed. The data of the above (1) to (4) is stored in a non-volatile storage device such as, for example, a read only memory (ROM), a flash memory, an erasable programmable ROM (EPROM), an EEPROM (registered trademark) (Electrically EPROM), or a hard disc drive (HDD). The PLC 20 may include a temporary storage unit (not shown). The temporary storage unit is a so-called working memory that temporarily stores data used for calculation, calculation results, or the like in the procedure of various processes executed by the PLC 20, and is constituted by a volatile storage device such as a random access memory (RAM). Which data is stored in which storage device is appropriately determined from the purpose of use, convenience, cost, physical constraints, or the like of the PLC 20. The storage unit 210 further stores a reference value and a target value.

The reference value is data indicating "a predetermined ideal state of the workpiece 60 or the like to be realized by the actuator 40 that has accepted the comparison match output from the counter unit 10." The reference value is, for example, a preset mount position indicating "the ideal position of the workpiece 60 at a point in time when a mount member 70 is attached by the actuator 40" in the mount application. In addition, "the ideal weight and cumulative amount (that is, the ideal amount of filling) of a workpiece at a point in time when a valve is closed and filling is stopped" in a liquid filling application can also be given as an example of the reference value.

The target value is a value which is transmitted to the counter unit 10 in order to realize "a predetermined ideal state of the workpiece 60 or the like" corresponding to the reference value and is determined the counter unit 10 to match the actual measurement value. Here, a point in time when a total time of the waiting time indicated by the timing adjustment value Ta and the response time has elapsed from the point in time when it was determined that the target value and the actual measurement value match is a point in time when the workpiece 60 or the like enters a predetermined ideal state corresponding to the reference value. That is, the actual measurement value (for example, the corrected target value in (B) of FIG. 2) corresponding to a point in time when "the total time of the waiting time indicated by the timing adjustment value Ta and the response time" is traced back from "the point in time when the workpiece 60 or the like enters a predetermined ideal state corresponding to the reference value" is set as the target value.

The target value is, for example, an operation start position in the mount application, and the counter unit 10 waits for the waiting time indicated by the timing adjustment value Ta from a point in time when it was determined that "the position of the workpiece 60 (the actual measurement value) has reached the operation start position," and executes the comparison match output. In addition, the target value is, for example, the amount of valve closing operation start in the liquid filling application, and the counter unit 10 waits for the waiting time indicated by the timing adjustment value Ta from a point in time when it was determined that "the amount of filling (the actual measurement value) matches the amount of valve closing operation start," and executes the comparison match output.

That is, the PLC 20 (control device) includes the timing calculation unit 220 (update unit), and transmits the timing adjustment value Ta and the target value which are updated by the timing calculation unit 220 to the counter unit 10. The timing calculation unit 220 updates the timing adjustment value Ta using "a value indicating the actual state of the workpiece 60 or the like realized by the actuator 40 that has accepted the output from the counter unit 10" as a feedback value related to the output.

According to the above configuration, the PLC 20 updates the timing adjustment value Ta to an appropriate value using the feedback value, and transmits the updated timing adjustment value Ta and the target value to the counter unit 10.

Therefore, the PLC 20 has an effect that the timing of the output can be adjusted to an appropriate point in time independent of the cycle Tp of the pulse signal by transmitting the timing adjustment value Ta updated to an appropriate value and the target value.

Here, the PLC 20 may acquire the feedback value from, for example, a state detection device realized using the imaging device 50 (camera), various types of sensors (such as specifically a displacement sensor, a load cell, and a distance measurement device using a laser or the like), or the like. In addition, the PLC 20 may be formed integrally with the counter unit 10.

The timing calculation unit 220 updates the timing adjustment value Ta using a difference between a reference value indicating a predetermined ideal state of the workpiece 60 or the like to be realized by the actuator 40 that has accepted the output and a value calculated by statistically processing the plurality of feedback values.

According to the above configuration, the PLC 20 updates the timing adjustment value Ta for adjusting the timing of the output to an appropriate value by using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the PLC 20 has an effect that, even in a case where the feedback values temporarily indicate abnormal values, the timing adjustment value Ta can be updated to an appropriate value in which the influence of such abnormal values is suppressed.

(Details of Imaging Device)

The imaging device 50 (state detection device) captures an image of the actual state of the workpiece 60 realized by the actuator 40 that has accepted the comparison match output from the counter unit 10, and transmits the captured image data as a feedback value related to the comparison match output to the PLC 20. Particularly, the imaging device 50 transmits the captured image data to the PLC 20 each time an image of the actual state of the workpiece 60 is captured.

For example, the imaging device 50 captures an image of (detects) the state of the workpiece 60 (specifically, the position of the workpiece 60 at a point in time when the mount member 70 is attached) at a point in time when the mount member 70 is attached by the actuator 40 that has accepted the comparison match output. The imaging device 50 transmits the captured image data generated by image capturing as a feedback value related to the comparison match output to the PLC 20.

(Entirety of Control System)

As illustrated in FIG. 1, the control system 1 includes the counter unit 10, the PLC 20, and a state detection device such as the imaging device 50. The state detection device detects the actual state of the workpiece 60 or the like realized by the actuator 40 that has accepted the output from the counter unit 10, and transmits a value indicating the detected actual state of the workpiece 60 as the feedback value to the PLC 20.

According to the above configuration, the control system 1 includes the counter unit 10, the PLC 20, and the state detection device. In the control system 1, the counter unit 10 adjusts the timing of the output using the timing adjustment value Ta updated by the timing calculation unit 220 of the PLC 20.

The control system 1 has an effect that the timing adjustment value Ta can be updated to an appropriate value using the feedback value detected by the state detection device. In addition, the control system 1 has an effect that the timing of the output can be adjusted to a timing independent of the cycle Tp of the pulse signal using the timing adjustment value Ta updated to an appropriate value.

Particularly, the time indicated by the timing adjustment value Ta is independent of the cycle Tp of the pulse signal, and thus even in a case where the pulse cycle Tp is long, the control system 1 can precisely adjust the timing of the output. In addition, even in a case where the pulse cycle Tp changes, the control system 1 can easily adjust the timing of the output simply by changing the timing adjustment value Ta by the amount of a change in the pulse cycle Tp, which leads to high user convenience.

Here, the state detection device can be realized using, for example, the imaging device 50 (camera), various types of sensors (such as specifically a displacement sensor, a load cell, and a distance measurement device using a laser or the like), or the like. In addition, the counter unit 10 and the PLC 20 may be formed integrally with each other.

In the control system 1, the PLC 20 updates the timing adjustment value Ta using a difference between a reference value indicating a predetermined ideal state of the workpiece 60 to be realized by the actuator 40 that has accepted the output and a value calculated by statistically processing the plurality of feedback values.

According to the above configuration, the control system 1 adjusts the timing of the output using the timing adjustment value Ta updated using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the control system 1 has an effect that, even in a case where the feedback values temporarily indicate abnormal values, the timing of the output can be adjusted with a high degree of accuracy using the timing adjustment value Ta updated to an appropriate value by suppressing the influence of such abnormal values.

3. Operation Example

Figure 3:
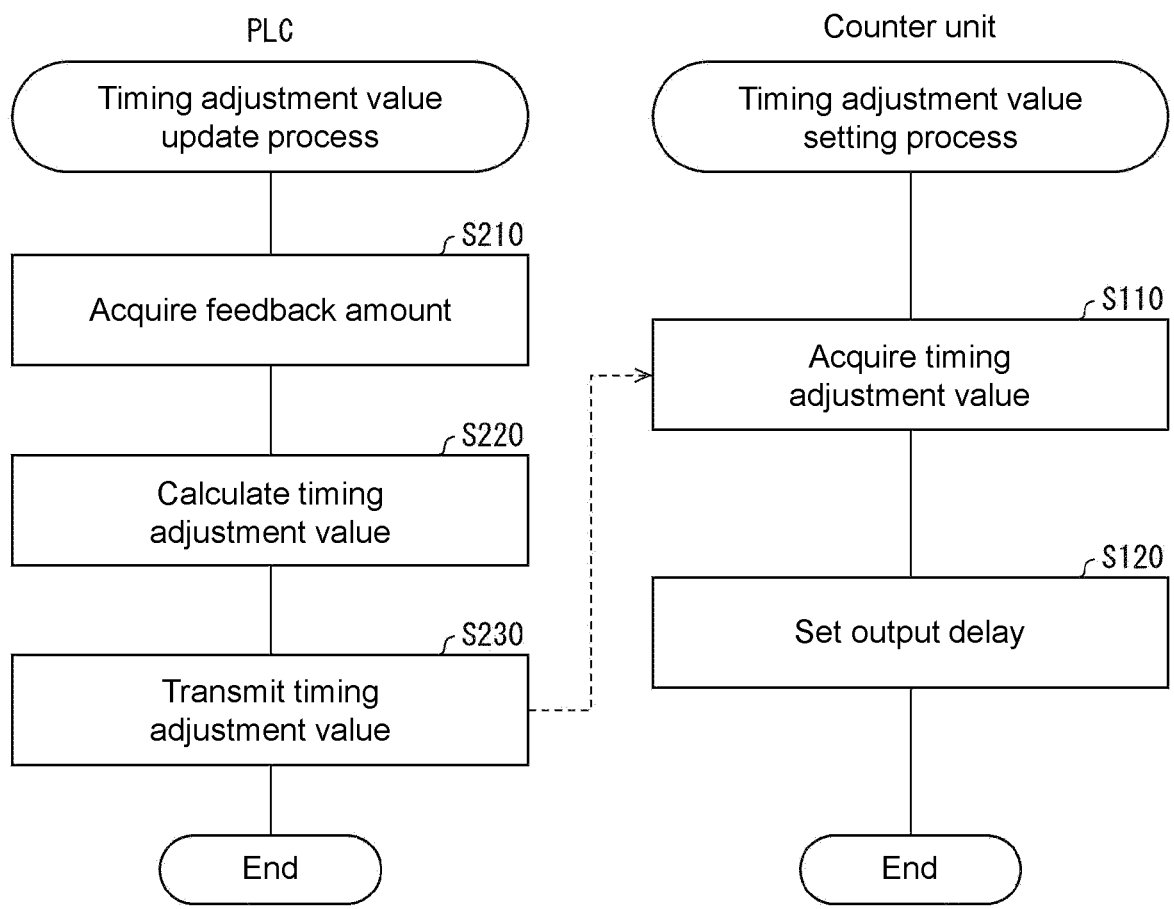
FIG. 3 is a flow diagram illustrating an example of processing which is executed in the entirety of the control system of FIG. 2.

FIG. 3 is a flow diagram illustrating an example of processing which is executed in the entirety of the control system 1. As shown in FIG. 3, the timing calculation unit 220 of the PLC 20 acquires the amount of feedback (that is, a feedback value related to the comparison match output) from a state detection device such as the imaging device 50 as a timing adjustment value update process (S210).

The amount of feedback acquired by the PLC 20 from the state detection device is data indicating the actual state of the workpiece 60 or the like realized by the actuator 40 that has accepted the comparison match output in each application. The amount of feedback is, for example, data indicating an actual mount position in the case of a mount application (a process in which the control system 1 causes the actuator 40 to attach the mount member 70 to the workpiece 60), and the details thereof will be described later with reference to FIG. 10 or the like. In addition, the amount of feedback is, for example, data indicating an actual amount of filling in the case of a liquid filling application (a process in which the control system 1 causes a valve which is an actuator to stop filling a liquid into the workpiece), and the details thereof will be described later with reference to FIG. 11 or the like.

The timing calculation unit 220 calculates (updates) the timing adjustment value Ta using the amount of feedback acquired in S210 (S220). The PLC 20 transmits the timing adjustment value Ta calculated (updated) by the timing calculation unit 220 in S220 to the counter unit 10 (S230).

The communication unit 110 of the counter unit 10 acquires the timing adjustment value Ta transmitted by the PLC 20 in S230 as a timing adjustment value setting process (S110), and repeatedly acquires the latest timing adjustment value Ta along with the target value, for example, for each control cycle of the PLC 20. The output delay unit 160 of the counter unit 10 sets the timing adjustment value Ta acquired in S110 as a waiting time, that is, as an output delay (S120, output delay step).

In the counter unit 10, the measurement unit 130 measures the actual measurement value such as the position of the workpiece or the amount of filling using the pulse signal from a pulse signal generation device such as the encoder 30 (measurement step). The determination unit 140 determines whether the actual measurement value measured in the measurement step matches the target value (determination step), and when it is determined in the determination step that the actual measurement value and the target value match, the output unit 150 executes the comparison match output to the actuator 40 (output step). Particularly, the output unit 150 executes the comparison match output at a point in time when the waiting time set by the output delay unit 160 in the output delay step (S120) has elapsed from a point in time when it was determined in the determination step that the actual measurement value and the target value match.

The processing executed by the counter unit 10 (in other words, the control method executed by the counter unit 10) described so far with reference to FIG. 3 can be arranged as follows. That is, the processing (control method) executed by the counter unit 10 includes a measurement step of counting the number of pulses of a pulse signal and measuring an actual measurement value, a comparison step of determining a match between the actual measurement value measured in the measurement step and a target value, and an output step of executing an output to an actuator when it is determined in the comparison step that the actual measurement value and the target value match, wherein the output step includes an output delay step (S120) of adjusting a timing of the output from a point in time when it is determined in the comparison step that the actual measurement value and the target value match to a point in time when a time independent of a cycle of the pulse signal indicated by a timing adjustment value has elapsed.

According to the above configuration, the control method accepts the pulse signal as an input from a pulse signal generation device that generates the pulse signal in accordance with the amount of detection such as, for example, the encoder 30 or a flowmeter, and measures the actual measurement value from the accepted pulse signal. When it is determined that the actual measurement value and the target value match, the control method executes the output at a point in time when the time independent of the cycle Tp of the pulse signal which is indicated by the timing adjustment value Ta has elapsed from the point in time when it was determined that they match.

In the related art, there is a known technique of, when it is determined that the actual measurement value measured by counting the number of pulses of the pulse signal and the target value match, adjusting the timing of the output of the counter unit that executes the output by increasing or decreasing the target value.

Here, the target value can be increased or decreased only by an integer multiple of the actual measurement value equivalent to "the cycle of the pulse signal (the pulse cycle Tp)." Therefore, in the counter unit of the related art that adjusts the timing of an output using only the target value, the resolution related to the adjustment of the output timing is limited to the pulse cycle Tp. Particularly, in a case where the pulse cycle Tp is long, the counter unit of the related art cannot precisely adjust the output timing, and thus a timing error becomes large. In addition, the response time is constant regardless of the pulse cycle Tp, and thus in a case where the pulse cycle Tp changes, the counter unit of the related art cannot maintain the output timing unless the target value is increased or decreased according to the changing pulse cycle Tp, which leads to low user convenience.

In contrast to such a counter unit of the related art, the control method adjusts the timing of the output using the timing adjustment value Ta indicating the time (waiting time) independent of the cycle Tp of the pulse signal in addition to the target value. That is, the control method adjusts a timing of the output from a point in time when it is determined that the actual measurement value and the target value match to a point in time when the time independent of the cycle Tp of the pulse signal which is indicated by the timing adjustment value Ta has elapsed.

Therefore, the control method has an effect that the timing of the output can be adjusted using the timing adjustment value Ta without relying on the cycle Tp of the pulse signal, that is, independently of the cycle Tp of the pulse signal. Particularly, the time indicated by the timing adjustment value Ta is independent of the cycle Tp of the pulse signal, and thus even in a case where the pulse cycle Tp is long, the control method makes it possible to precisely adjust the timing of the output. In addition, even in a case where the pulse cycle Tp changes, the control method makes it possible to easily adjust the timing of the output simply by changing the timing adjustment value Ta by the amount of a change in the pulse cycle Tp, which leads to high user convenience.

(Outline of Timing Adjustment Value)

FIG. 4 is a diagram illustrating the timing adjustment value Ta which is set by the counter unit 10. The counter unit 10 can perform high-accuracy control by adjusting the timing of "the output (comparison match output) to the actuator 40," executed when it is determined that the actual measurement value measured by using the pulse signal and target value match, without relying on the cycle Tp of the pulse signal.

(A) of FIG. 4 is a diagram illustrating the timing adjustment value Ta which is set by the counter unit 10 with respect to a process of mounting a component (the mount member 70 in the example shown in FIG. 1) on the workpiece 60 (mount application).

The counter unit 10 calculates the amount of movement of the workpiece 60 (in other words, a conveyor) by counting the number of pulses of the pulse signal from the encoder 30, that is, by a count value, and ascertains the position of the workpiece 60 (the actual measurement value). The counter unit 10 executes the output to the actuator 40 at a point in time when the timing adjustment value Ta (waiting time) has elapsed from a point in time when it was determined that "the workpiece 60 has reached the start position (target value)." The actuator 40 attaches (mounts) the mount member 70 to the workpiece 60 at a time when "a total time of the response time and the timing adjustment value Ta" has elapsed from a point in time when it was determined that "the workpiece 60 has reached the start position."

The counter unit 10 waits for the period of time of the timing adjustment value Ta and then executes the output to the actuator 40, so that the actuator 40 can attach the mount member 70 to an ideal position on the workpiece 60. That is, the counter unit 10 waits for the output to the actuator 40 for the period of time of the timing adjustment value Ta to match the actual mount position of the mount member 70 with the ideal mount position of the mount member 70.

(B) of FIG. 4 is a diagram illustrating the timing adjustment value Ta which is set by the counter unit 10 with respect to a process of filling a liquid into the workpiece 60 (liquid filling application).

The counter unit 10 calculates the amount of filling of a liquid into the workpiece 60 by counting the number of pulses of a pulse signal from a flowmeter which is a pulse signal generation device, that is, by a count value, and ascertains the amount of filling of a liquid filled into the workpiece 60. The counter unit 10 executes an output to a valve (that is, an actuator) at a point in time when the timing adjustment value Ta (waiting time) has elapsed from a point in time when it was determined that "the count value (that is, the number of pulses of the pulse signal) matches the comparison count value (target value)." The valve stops filling a liquid into the workpiece 60 at a time when "the total time of the response time and the timing adjustment value Ta" has elapsed from a point in time when it was determined that "the count value matches the comparison count value."

The counter unit 10 waits for the period of time of the timing adjustment value Ta and then executes the output to the valve, so that the valve can match an actual amount of filling into the workpiece 60 with the target value (ideal amount of filling) of the amount of filling into the workpiece 60. That is, the counter unit 10 waits for the output to the valve for the period of time of the timing adjustment value Ta to match an actual value for the amount of filling into the workpiece 60 with a target value for the amount of filling into the workpiece 60.

Example of Connection Between Counter Unit and PLC

The counter unit 10 and the PLC 20 may be communicably connected to each other so that signals (data) can be transmitted and received to and from each other for each constant communication cycle, and a connection system between the counter unit 10 and the PLC 20 is not particularly limited.

FIG. 5 is a diagram illustrating an example of connection between the counter unit 10 and the PLC 20. The counter unit 10 and the PLC 20 are communicably connected to each other, and particularly repeatedly transmit and receive data to and from each other in a predetermined communication cycle (for example, the control cycle of the PLC 20). The counter unit 10 is only required to be able to communicate periodically with the PLC 20, and the bus/network configuration between the counter unit 10 and the PLC 20 is not particularly limited.

That is, as shown in (A) of FIG. 5, the counter unit 10 and the PLC 20 may be communicably connected to each other through a PLC direct connection bus. That is, the counter unit 10 may be configured integrally with the PLC 20 (in other words, as a function unit of the PLC 20), and the counter unit 10 and the PLC 20 (particularly, the CPU unit of the PLC 20) may be connected to each other by an internal bus.

In addition, as shown in (B) of FIG. 5, the counter unit 10 and the PLC 20 may be communicably connected to each other through a field network. As the field network in which the counter unit 10 and the PLC 20 are connected to each other, various types of industrial Ethernet (registered trademark) can be typically used. As industrial Ethernet (registered trademark), for example, EtherCAT (registered trademark), Profinet IRT, MECHATROLINK (registered trademark)-III, Powerlink, SERCOS (registered trademark)-III, CIP Motion, and the like are known, and any of these may be adopted. Further, a field network other than industrial Ethernet (registered trademark) may be used. For example, in a case where motion control is not performed, DeviceNet, CompoNet/IP (registered trademark), or the like may be used. In the example shown in (B) of FIG. 5, in a master-slave control system using the PLC 20 as a master device, the counter unit 10 as a slave device is connected to the PLC 20 through a field network.

Further, as shown in (C) of FIG. 5, the counter unit 10 and the PLC 20 may be communicably connected to each other through an internal bus of an IO terminal. More accurately, the counter unit 10 and a coupler unit (communication coupler) may be communicably connected to each other through an internal bus of an IO terminal (internal bus), and may integrally form an IO unit. In a master-slave control system using the PLC 20 as a master device, an IO unit including the counter unit 10 and the coupler unit may be connected to the PLC 20 through a field network as a slave device.

(Details of Timing Adjustment Value)

Figure 6:
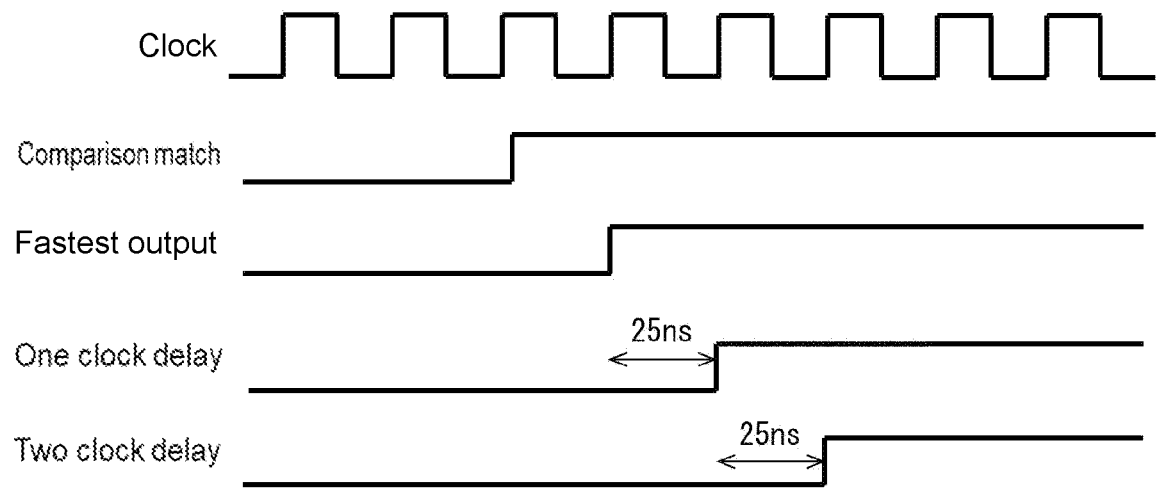
FIG. 6 is a diagram illustrating details of the timing adjustment value which is set by the counter unit of FIG. 1.

FIG. 6 is a diagram illustrating details of the timing adjustment value Ta which is set by the counter unit 10. In a case where the output unit 150 is realized by hardware, the timing adjustment value Ta relies on the clock frequency of hardware that realizes the output unit 150, that is, the timing adjustment value Ta is an integer multiple of one clock. Therefore, for example, in a case where the output unit 150 is realized by hardware operating at a clock frequency of 40 MHz, the counter unit 10 can adjust the timing of an output to the actuator 40 with a resolution of one clock (that is, 25 ns). That is, in a case where the output unit 150 controls the timing of an output to the actuator 40 with a clock of 40 MHz, the timing adjustment value Ta can be set as an integer multiple of one clock (that is, 25 ns), and the resolution related to the output timing of the counter unit 10 is 25 ns.

For example, as the fastest output, the timing adjustment value Ta can be set to "25 ns." In the case, the counter unit 10 executes the output to the actuator 40 25 ns after a point in time when it is determined that "the actual measurement value measured by using the pulse signal and the target value match."

In addition, in a case where the timing adjustment value Ta is set to "a value delayed by one clock from the fastest output," the counter unit 10 executes the output to the actuator 40 50 ns after a point in time when it is determined that "the actual measurement value measured by using the pulse signal and the target value match."

Similarly, in a case where the timing adjustment value Ta is set to "a value delayed by two clocks from the fastest output," the counter unit 10 executes the output to the actuator 40 75 ns after a point in time when it is determined to be "match."

Performance Example of Each Device Included in Control System

Figure 7:
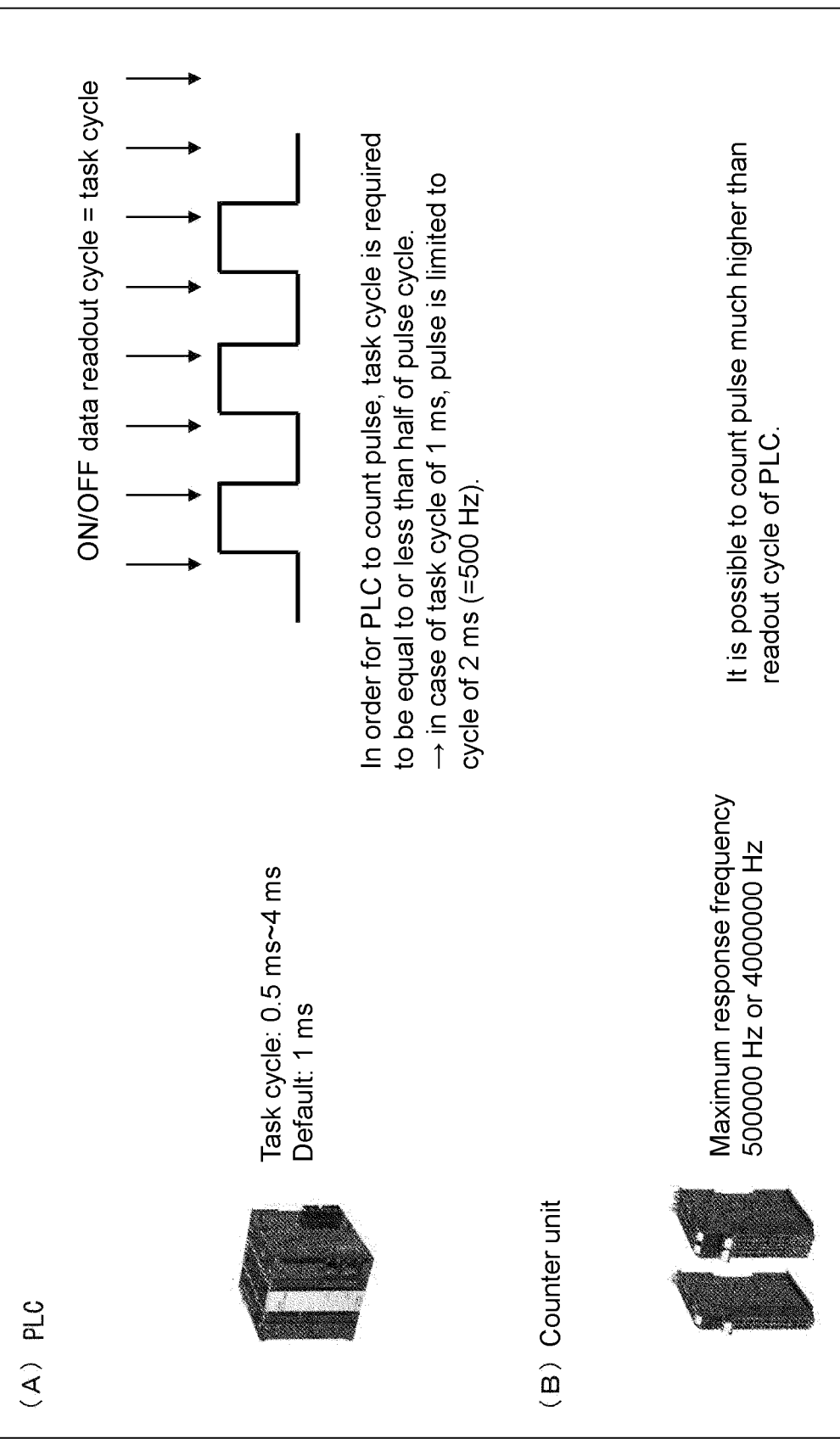
FIG. 7 is a diagram illustrating performance or the like of devices included in the control system of FIG. 2.

FIG. 7 is a diagram illustrating performance or the like of the PLC 20 and the counter unit 10 included in the control system 1. As shown in (A) of FIG. 7, the control cycle (task cycle) of the PLC 20 is, for example, "0.5 ms" to "4 ms," and is "1 ms" by default. Here, the term "control cycle" refers to the readout cycle of ON/OFF data.

In order for the PLC 20 to count the number of pulses of the pulse signal, the task cycle is required to be equal to or less than half of the cycle Tp of the pulse signal. Therefore, in a case where the task cycle of the PLC 20 is "1 ms," the cycle of the pulse signal that the PLC 20 can count the number of pulses is limited to "2 ms (that is, 500 Hz)."

As shown in (B) of FIG. 7, the maximum response frequency of the counter unit 10 is, for example, "500,000 Hz" or "4,000,000 Hz," and the maximum response frequency of the counter unit 10 is much higher than the readout cycle (control cycle) of the PLC 20. The counter unit 10 can count a pulse signal having a cycle much higher than the pulse signal that the PLC 20 can count.

FIG. 8 is a diagram illustrating performance or the like of a pulse signal generation device such as the encoder 30 and a flowmeter included in the control system 1. As shown in (A) of FIG. 8, since the encoder 30 with, for example, 720 resolution of 300 rpm (five revolutions per second) has "720*5=3,600 pulses" per second, that is, 3,600 Hz, the pulse cycle is "1/3600=278 μs."

Therefore, in a case where the output timing is attempted to be adjusted using the target value alone without using the timing adjustment value Ta, the resolution related to the output timing (in other words, timing adjustment) is "278 μs." In a case where the resolution related to the timing adjustment is desired to be improved more than this at the same speed without using the timing adjustment value Ta, it is necessary to use an encoder with a high resolution (that is, a higher pulse cycle), which means that the procurement cost of the encoder 30 increases.

As shown in (B) of FIG. 8, for example, in the case of a flowmeter that outputs a pulse signal of 3,000 Hz which is half of the maximum 6,000 Hz, the pulse cycle is "1/3000=333 μs." The flowmeter is generally a pulse signal generation device that generates a pulse slower than an encoder.

In a case where the timing adjustment is desired to be performed with a high degree of accuracy using the target value alone without using the timing adjustment value Ta, a flowmeter with a high resolution is required as with the encoder, which means that the procurement cost of the flowmeter increases.

(Update of Timing Adjustment Value Ta)

Figure 9:
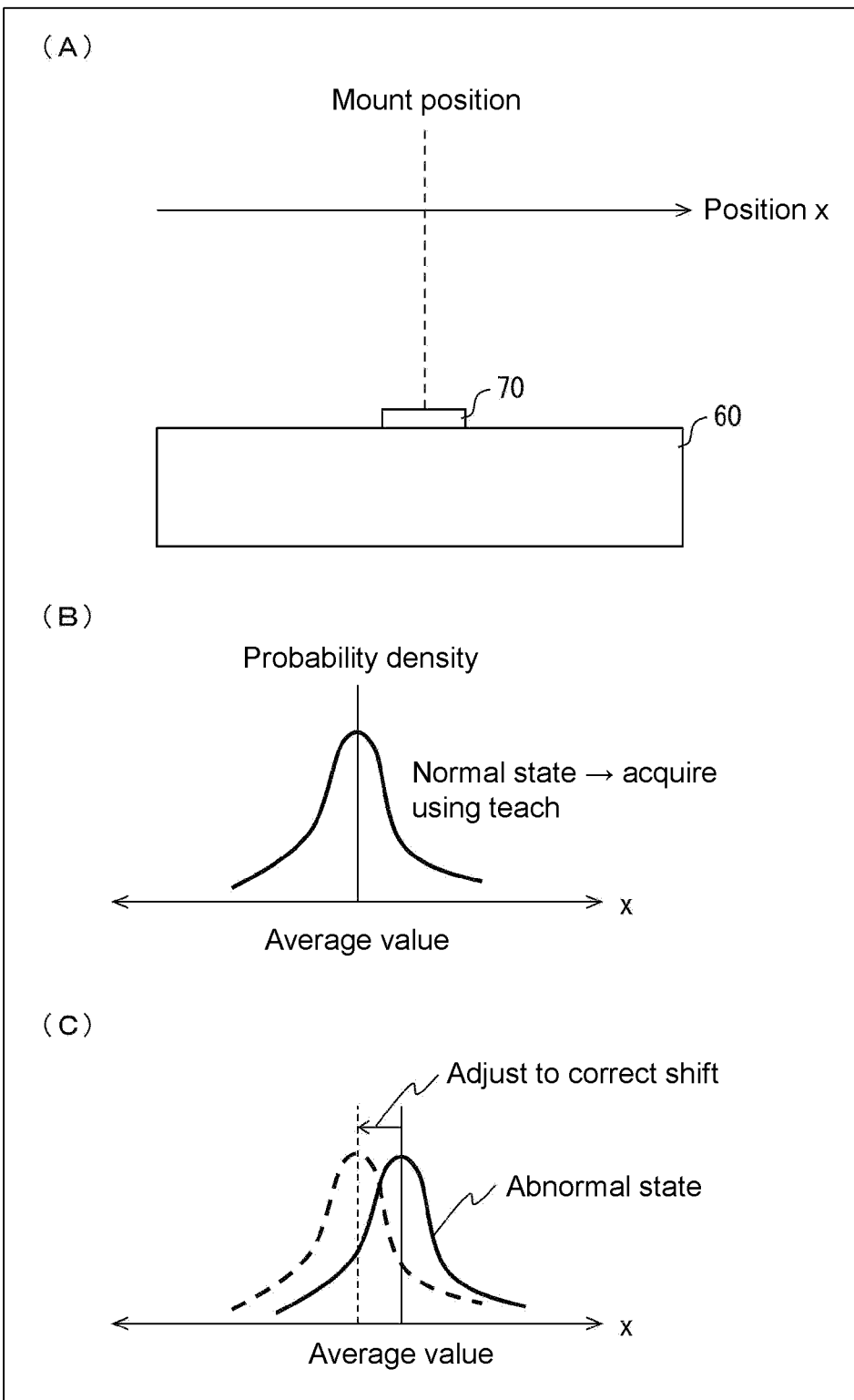
FIG. 9 is a diagram illustrating an outline of a method of updating the timing adjustment value in a mount application.

FIG. 9 is a diagram illustrating an outline of a method of updating the timing adjustment value Ta in the mount application. The timing calculation unit 220 of the PLC 20 performs statistical processing on feedback values related to the comparison match output performed by the counter unit 10, and calculates, for example, an average value of a plurality of feedback values. The feedback value related to the comparison match output performed by the counter unit 10 is a value indicating "the actual state of the workpiece 60 or the like" realized by the actuator 40 that has accepted the comparison match output from the counter unit 10, and an example thereof is a mount position to be described later.

When it is determined that the statistical value (for example, the average value) related to the feedback value has changed, the timing calculation unit 220 adjusts the timing adjustment value Ta, that is, updates the timing adjustment value Ta so as to cancel a difference of the statistical value related to the feedback value from a reference value. The reference value is a value indicating "a predetermined ideal state of the workpiece 60 or the like" to be realized by the actuator 40 that has accepted the comparison match output from the counter unit 10, and an example thereof is a predetermined ideal mount position.

The timing calculation unit 220 constantly logs position data (data indicating a mount position), for example, as a feedback value, and performs statistical testing such as t testing using the reference value on the average value of the feedback values at regular time intervals. When it is determined by the statistical testing that "the average value of the feedback values has changed significantly from a normal state," the timing calculation unit 220 updates the timing adjustment value Ta so as to cancel a change in the average value of the feedback values (a difference from the reference value).

(A) of FIG. 9 is a diagram illustrating "the mount position x of the workpiece 60" as a feedback value in the mount application. The mount position x indicates the position of the workpiece 60 to which the mount member 70 is attached in the local coordinate system of (A) of FIG. 9, in other words, indicates the attachment position of the mount member 70 on the workpiece 60. In FIG. 9, in a case where the workpiece 60 is assumed to be placed on the conveyor and to move at a constant speed from the left side of the page to the right side of the page, the mount position x indicates the following position. That is, the mount position x indicates the attachment position of the mount member 70 on the workpiece 60 in the movement direction of the conveyor.

(B) of FIG. 9 shows a statistical distribution related to the reference value, and shows a statistical distribution related to the feedback values in a normal state in a case where the feedback value (=the mount position x) in which "the average value matches the reference value" is represented as "the feedback value in a normal state." In the "statistical distribution related to the feedback value in a normal state (that is, the reference value)" shown in (B) of FIG. 9, the horizontal axis represents the average value of the mount position x, and the vertical axis represents probability density. The timing calculation unit 220 acquires "the statistical distribution related to the feedback value in a normal state" as illustrated in (B) of FIG. 9 in advance using, for example, teach or the like. The "statistical distribution related to the feedback value in a normal state (that is, the reference value)" shown in (B) of FIG. 9 is shown by a dotted line in (C) of FIG. 9.

As shown in (C) of FIG. 9, the timing calculation unit 220 determines whether the feedback value deviates from the reference value (that is, "the feedback value in a normal state") by a predetermined magnitude or more through statistical testing such as t testing. When it is determined that the feedback value deviates from the reference value by a predetermined magnitude or more, the timing calculation unit 220 changes (updates) the timing adjustment value Ta so as to eliminate deviation between the two.

For example, when a shift (difference) between the average value of the feedback values and the reference value is equal to or greater than a predetermined value, the timing calculation unit 220 determines to be an abnormality (that an abnormality has occurred). The timing calculation unit 220 that determines that an abnormality has occurred adjusts the timing adjustment value Ta so as to correct the shift.

In the example shown in (C) of FIG. 9, the average value of the feedback values shown by a solid line is shifted from the reference value (the average value of the feedback values in a normal state) shown by a dotted line by a predetermined magnitude or more to the right side of the page, that is, the mount position is shifted closer to the right side of the page than the ideal mount position. This indicates that, at a point in time of mount (a point in time when the mount member 70 is attached), the workpiece 60 is shifted closer to the left side of the page than "the position of the workpiece 60 during mount" in a normal state illustrated in (B) of FIG. 9.

Consequently, the timing calculation unit 220 increases the timing adjustment value Ta in order to move the average value of the feedback values to the right side of the page, that is, in order to move the average value of the position of the workpiece 60 at a point in time when the mount member 70 is attached to the right side of the page. Since the workpiece 60 moves at a constant speed from the left side of the page to the right side of the page, the point in time when the mount member 70 is attached to the workpiece 60 is delayed by the amount of the increase of the timing adjustment value Ta, and the position of the workpiece 60 at a point in time of attachment moves to the right side of the page.

The control system 1 can update the timing adjustment value Ta to an appropriate value by reflecting a difference between the reference value and the feedback value in the timing adjustment value Ta, and can realize high-accuracy control using the updated timing adjustment value Ta.

Acquisition Example (1) of Feedback Value; Mount Position

FIG. 10 is a diagram illustrating a specific example of a method of detecting the mount position x in the mount application. A state detection device detects the actual state (for example, the mount position x) of the workpiece 60 or the like realized by the actuator 40 that has accepted the comparison match output from the counter unit 10, and transmits a detection result as a feedback value related to the comparison match output to the PLC 20.

(A) of FIG. 10 shows an example in which the imaging device 50 (camera) is used as a state detection device to detect the actual state (particularly, the mount position x) of the workpiece 60 at a point in time when the mount member 70 is attached as a feedback value related to the comparison match output. As shown in (A) of FIG. 10, in a captured image which is captured by the imaging device 50, the position (the mount position x) of the workpiece 60 at a point in time when the mount member 70 is attached by the actuator 40 that has accepted the comparison match output is specified.

In the captured image, the "mount position x" indicates the position of the workpiece 60 to which the mount member 70 is attached in the local coordinate system in (A) of FIG. 10, in other words, the attachment position of the mount member 70 on the workpiece 60. In FIG. 10, in a case where the workpiece 60 is assumed to be placed on the conveyor and to move at a constant speed from the left side of the page to the right side of the page, the mount position x indicates the following position. That is, the mount position x indicates the attachment position of the mount member 70 on the workpiece 60 in the movement direction of the conveyor. The timing calculation unit 220 of the PLC 20 uses the captured image acquired from the imaging device 50 for each control cycle to specify the state (for example, the mount position x) of the workpiece 60 or the like at a point in time when the mount member 70 is attached as a feedback value related to the comparison match output.

(B) of FIG. 10 shows an example in which a displacement sensor 51 is used as a state detection device to detect the actual state (particularly, the mount position x) of the workpiece 60 at a point in time when the mount member 70 is attached as a feedback value related to the comparison match output. In (B) of FIG. 10, the "position of the component (the mount member 70)" indicates a measurement distance, that is, "the position (=the mount position x) of the workpiece 60 at a point in time when the mount member 70 is attached."

As shown in (B) of FIG. 10, the displacement sensor 51 detects a measurement distance at a point in time when the mount member 70 is attached by the actuator 40 that has accepted the comparison match output, and transmits the detected measurement distance as a feedback value to the PLC 20. The timing calculation unit 220 of the PLC 20 uses the measurement distance acquired from the displacement sensor 51 for each control cycle to specify the state (for example, the mount position x) of the workpiece 60 or the like at a point in time when the mount member 70 is attached as a feedback value related to the comparison match output.

Acquisition Example (1) of Feedback Value; Amount of Filling

FIG. 11 is a diagram illustrating a specific example of a method of detecting an actual amount of filling in the liquid filling application. The state detection device detects the actual state (for example, the weight and cumulative amount) of the workpiece 60 or the like realized by the actuator 40 that has accepted the comparison match output from the counter unit 10, and transmits a detection result as a feedback value related to the comparison match output to the PLC 20.

(A) of FIG. 11 shows an example in which a load cell 52 is used as a state detection device to detect the actual weight and cumulative amount of a liquid filled into a workpiece 61 at a point in time when a valve (actuator) stops filling as a feedback value related to the comparison match output.

As shown in (A) of FIG. 11, the load cell 52 detects the weight and cumulative amount of the workpiece 61 at a point in time when liquid filling is stopped by the valve that has accepted the comparison match output, and transmits a voltage value indicating the detected weight and cumulative amount as a feedback value to the PLC 20. The timing calculation unit 220 of the PLC 20 uses the voltage value acquired from the load cell 52 for each control cycle to specify the state (for example, the weight and cumulative amount) of the workpiece 61 at a point in time when the liquid filling is stopped as a feedback value related to the comparison match output.

(B) of FIG. 11 shows an example in which a distance measurement device 53 is used as a state detection device to detect a distance to the liquid level of a liquid filled into the workpiece 61 at a point in time when a valve (actuator) stops filling as a feedback value related to the comparison match output. In (B) of FIG. 11, the "distance to the liquid level" indicates "the amount of filling of a liquid filled into the workpiece 61 at a point in time when the valve stops filling."

As shown in (B) of FIG. 11, the distance measurement device 53 uses a laser or the like to detect a distance to the liquid level of a liquid filled into the workpiece 61 at a point in time when the valve that has accepted the comparison match output stops filling. The distance measurement device 53 transmits the detected measurement distance as a feedback value to the PLC 20. The timing calculation unit 220 of the PLC 20 uses the measurement distance acquired from the distance measurement device 53 for each control cycle to specify the state of the workpiece 61 or the like (for example, the amount of filling into the workpiece 61) at a point in time when the valve stops filling as a feedback value related to the comparison match output.

4. Modification Example (Control Device)

An example in which the control device that transmits the target value and the timing adjustment value Ta to the counter unit 10 for each constant communication cycle is the PLC 20 has been described so far. However, it is not essential that the control device that transmits the target value and the timing adjustment value Ta to the counter unit 10 is a PLC. The control device that transmits the target value and the timing adjustment value Ta to the counter unit 10 may be an industrial PC (IPC) or the like.

(Pulse Signal)

In addition, the description so far is, in principle, an example in which the cycle Tp of the pulse signal is constant. For example, the description has been made assuming that the amount of movement (movement speed) of the workpiece (conveyor) per unit time is constant, and the amount of filling (filling speed) of a liquid to be filled into the workpiece per unit time is constant.

However, the cycle Tp of the pulse signal is only required to be able to be predicted by the counter unit 10, and it is not essential for the counter unit 10 that the cycle Tp of the pulse signal is constant. In a case where the cycle Tp of the pulse signal can be predicted, the counter unit 10 can set the target value and the timing adjustment value Ta, and can generate a target value match (match between the actual measurement value and the target value) at a timing more than the response time before the operation completion timing of the actuator.

In the control system 1, the timing adjustment value Ta is only required to be able to be set as a value that does not rely on the cycle Tp of the pulse signal (that is independent of the cycle Tp of the pulse signal). The counter unit 10 uses the timing adjustment value Ta to set a time that does not rely on the cycle Tp of the pulse signal as a waiting time, and executes a predetermined output to the actuator at a point in time when the waiting time has elapsed from a point in time when it was determined that the actual measurement value and the target value match.

Realization Example Based on Software

Each functional block of the counter unit 10 and the PLC 20 (specifically, the communication unit 110, the setting unit 120, the measurement unit 130, the determination unit 140, the output unit 150, and the timing calculation unit 220) may be realized by a logic circuit (hardware) formed on an integrated circuit (IC chip) or the like, or may be realized by software using a central processing unit (CPU).

In the latter case, each of the counter unit 10 and the PLC 20 includes a CPU that executes a command of a program which is software for realizing each function, a read only memory (ROM) or a storage device (called a "recording medium") having the above program and various types of data recorded thereon so as to be readable by a computer (or CPU), a random access memory (RAM) that develops the above program, and the like. A computer (or CPU) reads and executes the above program from the above recording medium, and thus an objective of the present invention is achieved. An example of the recording medium capable of being used includes a "non-transitory tangible medium" such as, for example, a tape, a disk, a card, a semiconductor memory, or a programmable logic circuit. In addition, the program may be supplied to the above computer through any transmission medium (such as a communication network or a broadcast wave) which makes it possible to transmit the program. Meanwhile, the present invention may also be realized in a form of a carrier wave-buried data signal in which the program is embodied by electronic transmission.

(Supplement)

A counter unit according to an aspect of the present invention includes: a measurement unit that counts the number of pulses of a pulse signal and measures an actual measurement value; a comparison unit that determines a match between the actual measurement value measured by the measurement unit and a target value; and an output unit that executes an output to an actuator when the comparison unit determines that the actual measurement value and the target value match, wherein the output unit includes an output delay unit that adjusts a timing of the output from a point in time when the comparison unit determines that the actual measurement value and the target value match to a point in time when a time independent of a cycle of the pulse signal indicated by a timing adjustment value has elapsed.

According to the above configuration, the counter unit accepts the pulse signal as an input from a pulse signal generation device that generates the pulse signal in accordance with the amount of detection such as, for example, an encoder or a flowmeter, and measures the actual measurement value from the accepted pulse signal. When it is determined that the actual measurement value and the target value match, the counter unit executes the output at a point in time when the time independent of the cycle Tp of the pulse signal which is indicated by the timing adjustment value has elapsed from the point in time when it was determined that they match. Hereinafter, the timing adjustment value is also referred to as the "timing adjustment value Ta."

In the related art, there is a known technique of, when it is determined that the actual measurement value measured by counting the number of pulses of the pulse signal and the target value match, adjusting the timing of the output of the counter unit that executes the output by increasing or decreasing the target value.

Here, the target value can be increased or decreased only by an integer multiple of the actual measurement value equivalent to "the cycle of the pulse signal (the pulse cycle Tp)." Therefore, in the counter unit of the related art that adjusts the timing of an output using only the target value, the resolution related to the adjustment of the output timing is limited to the pulse cycle Tp. Particularly, in a case where the pulse cycle Tp is long, the counter unit of the related art cannot precisely adjust the output timing, and thus a timing error becomes large. In addition, the response time is constant regardless of the pulse cycle Tp, and thus in a case where the pulse cycle Tp changes, the counter unit of the related art cannot maintain the output timing unless the target value is increased or decreased according to the changing pulse cycle Tp, which leads to low user convenience.

In contrast to such a counter unit of the related art, the counter unit adjusts the timing of the output using the timing adjustment value Ta indicating the time (waiting time) independent of the cycle Tp of the pulse signal in addition to the target value. That is, the counter unit adjusts a timing of the output from a point in time when it is determined that the actual measurement value and the target value match to a point in time when the time independent of the cycle Tp of the pulse signal which is indicated by the timing adjustment value Ta has elapsed.

Therefore, the counter unit has an effect that the timing of the output can be adjusted using the timing adjustment value Ta without relying on the cycle Tp of the pulse signal, that is, independently of the cycle Tp of the pulse signal. Particularly, the time indicated by the timing adjustment value Ta is independent of the cycle Tp of the pulse signal, and thus even in a case where the pulse cycle Tp is long, the counter unit can precisely adjust the timing of the output. In addition, even in a case where the pulse cycle Tp changes, the counter unit can easily adjust the timing of the output simply by changing the timing adjustment value Ta by the amount of a change in the pulse cycle Tp, which leads to high user convenience.

In the counter unit according to an aspect of the present invention, the output unit is constituted by a logic circuit based on hardware, and the time indicated by the timing adjustment value may be an integer multiple of the clock of the logic circuit.

According to the above configuration, in the counter unit, the output unit is constituted by a logic circuit based on hardware. For example, the output unit may be realized using at least one of a field programmable gate array (FPGA), a complex programmable logic device (CPLD), and an application specific integrated circuit (ASIC). In the counter unit, the time indicated by the timing adjustment value Ta is an integer multiple of the clock of the logic circuit.

Here, the output unit is realized by a logic circuit based on hardware, and thus the amount of delay can be made smaller than in a case where the output unit is realized by software. That is, the output unit is realized by a logic circuit based on hardware, and thus a smaller value can be set for the time (waiting time) indicated by the timing adjustment value Ta than in the case where the output unit is realized by software. In addition, the output unit is realized by a logic circuit based on hardware, and thus a variation in delay can be suppressed more than in the case where the output unit is realized by software.

Therefore, when it is determined that the actual measurement value and the target value match, the counter unit has an effect that the counter unit can execute an output to the actuator with a smaller waiting time than in the case where the output unit is realized by software. In addition, the counter unit has an effect that a variation in delay can be suppressed more than in the case where the output unit is realized by software.

The counter unit according to an aspect of the present invention may further include a communication unit that receives the target value and the timing adjustment value from the control device that performs an input and output process on ON/OFF data in a predetermined control cycle.

According to the above configuration, the counter unit receives the target value and the timing adjustment value Ta from the control device, and adjusts the timing of the output using the received target value and timing adjustment value Ta.

Here, a communication system between the counter unit and the control device is not particularly limited. The counter unit and the control device are communicably connected to each other through, for example, a field network, and the counter unit may receive the target value and the timing adjustment value Ta from the control device through the field network. In addition, the counter unit may be formed integrally with the control device, that is, may be communicably connected to the control device through an internal bus. In that case, the counter unit may receive the target value and the timing adjustment value Ta from the control device through the internal bus.

For example, the counter unit repeatedly receives the target value and the timing adjustment value Ta from the control device for each control cycle, and adjusts the timing of the output using the received target value and timing adjustment value Ta.

Therefore, the counter unit has an effect that it is possible to compare the actual measurement value measured by the host device with the target value received from the control device, and to adjust the timing of the output using the timing adjustment value Ta received from the control device. That is, a user can adjust the timing of the output using the target value and the timing adjustment value Ta which are (for example, periodically) transmitted by the control device to the counter unit.

In the counter unit according to an aspect of the present invention, the timing adjustment value may be updated using a feedback value indicating an actual state of a workpiece realized by the actuator that has accepted the output from the counter unit.

According to the above configuration, the counter unit has an effect that the timing of the output can be adjusted with a high degree of accuracy using the timing adjustment value Ta updated to an appropriate value using a feedback value related to the output to the actuator.

In the counter unit according to an aspect of the present invention, the timing adjustment value may be updated using a difference between a reference value indicating a predetermined ideal state of the workpiece to be realized by the actuator that has accepted the output and a value calculated by statistically processing a plurality of the feedback values.

According to the above configuration, the counter unit adjusts the timing of the output using the timing adjustment value Ta updated to an appropriate value using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the counter unit has an effect that, even in a case where the feedback values temporarily indicate abnormal values, the timing of the output can be adjusted with a high degree of accuracy using the timing adjustment value Ta updated to an appropriate value by suppressing the influence of such abnormal values.

A control device according to an aspect of the present invention performs an input and output process on ON/OFF data in a predetermined control cycle, the control device including an update unit that updates a timing adjustment value using a value indicating an actual state of a workpiece realized by an actuator that has accepted an output from a counter unit as a feedback value related to the output, and the timing adjustment value updated by the update unit and a target value may be transmitted to the counter unit.

According to the above configuration, the control device updates the timing adjustment value Ta to an appropriate value using the feedback value, and transmits the updated timing adjustment value Ta and the target value to the counter unit.

Therefore, the control device has an effect that the timing of the output can be adjusted to an appropriate point in time independent of the cycle Tp of the pulse signal by transmitting the timing adjustment value Ta updated to an appropriate value and the target value.

Here, the control device may acquire the feedback value from, for example, a state detection device realized using an imaging device (camera), various types of sensors (such as specifically a displacement sensor, a load cell, and a distance measurement device using a laser or the like), or the like. In addition, the control device may be formed integrally with the counter unit.

In the control device according to an aspect of the present invention, the update unit may update the timing adjustment value using a difference between a reference value indicating a predetermined ideal state of the workpiece to be realized by the actuator that has accepted the output and a value calculated by statistically processing a plurality of the feedback values.

According to the above configuration, the control device updates the timing adjustment value Ta for adjusting the timing of the output to an appropriate value by using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the control device has an effect that, even in a case where the feedback values temporarily indicate abnormal values, the timing adjustment value Ta can be updated to an appropriate value in which the influence of such abnormal values is suppressed.

The control system according to an aspect of the present invention may include the counter unit, the control device, and a state detection device that detects the actual state of a workpiece realized by the actuator that has accepted the output from the counter unit and transmits a value indicating the detected actual state of the workpiece as the feedback value to the control device.

According to the above configuration, the control system includes the counter unit, the control device, and the state detection device, and the counter unit adjusts the timing of the output using the timing adjustment value updated by the update unit.

The control system has an effect that the timing adjustment value Ta can be updated to an appropriate value using the feedback value detected by the state detection device. In addition, the control system has an effect that the timing of the output can be adjusted to a timing independent of the cycle Tp of the pulse signal using the timing adjustment value Ta updated to an appropriate value.

Particularly, the time indicated by the timing adjustment value Ta is independent of the cycle Tp of the pulse signal, and thus even in a case where the pulse cycle Tp is long, the control system can precisely adjust the timing of the output. In addition, even in a case where the pulse cycle Tp changes, the control system can easily adjust the timing of the output simply by changing the timing adjustment value Ta by the amount of a change in the pulse cycle Tp, which leads to high user convenience.

Here, the state detection device can be realized using, for example, an imaging device (camera), various types of sensors (such as specifically a displacement sensor, a load cell, and a distance measurement device using a laser or the like), or the like. In addition, the counter unit and the control device may be formed integrally with each other.

In the control system according to an aspect of the present invention, the control device may update the timing adjustment value using a difference between a reference value indicating a predetermined ideal state of the workpiece to be realized by the actuator that has accepted the output and a value calculated by statistically processing a plurality of the feedback values.

According to the above configuration, the control system adjusts the timing of the output using the timing adjustment value Ta updated using the difference between the reference value and the value calculated by statistically processing the plurality of feedback values.

Here, the timing adjustment value Ta is updated using the value calculated by statistically processing the plurality of feedback values, so that even in a case where the feedback values temporarily indicate abnormal values, the influence of such abnormal values on the timing adjustment value Ta is suppressed.

Therefore, the control system has an effect that, even in a case where the feedback values temporarily indicate abnormal values, the timing of the output can be adjusted with a high degree of accuracy using the timing adjustment value Ta updated to an appropriate value by suppressing the influence of such abnormal values.

A counter unit control method according to an aspect of the present invention includes a measurement step of counting the number of pulses of a pulse signal and measuring an actual measurement value, a comparison step of determining a match between the actual measurement value measured in the measurement step and a target value, and an output step of executing an output to an actuator when it is determined in the comparison step that the actual measurement value and the target value match, wherein the output step includes an output delay step of adjusting a timing of the output from a point in time when it is determined in the comparison step that the actual measurement value and the target value match to a point in time when a time independent of a cycle of the pulse signal indicated by a timing adjustment value has elapsed.

According to the above configuration, the control method accepts the pulse signal as an input from a pulse signal generation device that generates the pulse signal in accordance with the amount of detection such as, for example, an encoder or a flowmeter, and measures the actual measurement value from the accepted pulse signal. When it is determined that the actual measurement value and the target value match, The control method executes the output at a point in time when the time independent of the cycle Tp of the pulse signal which is indicated by the timing adjustment value has elapsed from the point in time when it was determined that they match. Hereinafter, the timing adjustment value is also referred to as the "timing adjustment value Ta."

In the related art, there is a known technique of, when it is determined that the actual measurement value measured by counting the number of pulses of the pulse signal and the target value match, adjusting the timing of the output of the counter unit that executes the output by increasing or decreasing the target value.

Here, the target value can be increased or decreased only by an integer multiple of the actual measurement value equivalent to "the cycle of the pulse signal (the pulse cycle Tp)." Therefore, in the counter unit of the related art that adjusts the timing of an output using only the target value, the resolution related to the adjustment of the output timing is limited to the pulse cycle Tp. Particularly, in a case where the pulse cycle Tp is long, the counter unit of the related art cannot precisely adjust the output timing, and thus a timing error becomes large. In addition, the response time is constant regardless of the pulse cycle Tp, and thus in a case where the pulse cycle Tp changes, the counter unit of the related art cannot maintain the output timing unless the target value is increased or decreased according to the changing pulse cycle Tp, which leads to low user convenience.

In contrast to such a counter unit of the related art, the control method adjusts the timing of the output using the timing adjustment value Ta indicating the time (waiting time) independent of the cycle Tp of the pulse signal in addition to the target value. That is, the control method adjusts a timing of the output from a point in time when it is determined that the actual measurement value and the target value match to a point in time when the time independent of the cycle Tp of the pulse signal which is indicated by the timing adjustment value Ta has elapsed.

Therefore, the control method has an effect that the timing of the output can be adjusted using the timing adjustment value Ta without relying on the cycle Tp of the pulse signal, that is, independently of the cycle Tp of the pulse signal. Particularly, the time indicated by the timing adjustment value Ta is independent of the cycle Tp of the pulse signal, and thus even in a case where the pulse cycle Tp is long, the control method makes it possible to precisely adjust the timing of the output. In addition, even in a case where the pulse cycle Tp changes, the control method makes it possible to easily adjust the timing of the output simply by changing the timing adjustment value Ta by the amount of a change in the pulse cycle Tp, which leads to high user convenience.

The present invention is not limited to each of the embodiments described above, and can be changed variously in the scope shown in the claims, and embodiments obtained by appropriately combining technical means disclosed in each of the different embodiments are also included in the technical scope of the present invention.

REFERENCE SIGNS LIST

1 Control system
10 Counter unit
20 PLC (control device)
40 Actuator
50 Imaging device (state detection device)
51 Displacement sensor (state detection device)
52 Load cell (state detection device)
53 Distance measurement device (state detection device)
60 Workpiece
61 Workpiece
110 Communication unit
130 Measurement unit
140 Determination unit (comparison unit)
150 Output unit
160 Output delay unit
220 Timing calculation unit (update unit)
Ta Timing adjustment value
Tp Pulse cycle (cycle of pulse signal)

What is claimed is:

1. A counter unit comprising:
    a measurement unit configured to count a number of pulses of a pulse signal and measures an actual measurement value;
    a comparison unit configured to determine a match between the actual measurement value measured by the measurement unit and a target value; and
    an output unit configured to execute an output to an actuator when the comparison unit determines that the actual measurement value and the target value match,
    wherein the output unit comprises an output delay unit configured to adjust a timing of the output from a first point in time when the comparison unit determines that the actual measurement value and the target value match to a second point in time when a time independent of a cycle of the pulse signal indicated by a timing adjustment value has elapsed, wherein the output unit is constituted by a logic circuit based on hardware, and the time indicated by the timing adjustment value is an integer multiple of a clock of the logic circuit wherein the timing adjustment value is updated using a feedback value indicating an actual state of a workpiece realized by the actuator to which the output is accepted from the counter unit.

2. The counter unit according to claim 1, further comprising a communication unit configured to receive the target value and the timing adjustment value from a control device that performs an input and output process on ON/OFF data in a predetermined control cycle, wherein the ON/OFF data is data for controlling ON/OFF of the actuator.

3. The counter unit according to claim 2, wherein the timing adjustment value is updated using a feedback value indicating an actual state of a workpiece realized by the actuator to which the output is accepted from the counter unit.

4. The counter unit according to claim 1, wherein the timing adjustment value is updated using a feedback value indicating an actual state of a workpiece realized by the actuator to which the output is accepted from the counter unit.

5. The counter unit according to claim 4, wherein the timing adjustment value is updated using a difference between a reference value indicating a predetermined ideal state of the workpiece to be realized by the actuator to which the output is accepted and a value calculated by statistically processing a plurality of the feedback values.

6. The counter unit according to claim 1, further comprising a communication unit configured to receive the target value and the timing adjustment value from a control device that performs an input and output process on ON/OFF data in a predetermined control cycle, wherein the ON/OFF data is data for controlling ON/OFF of the actuator.

7. A control device that performs an input and output process on ON/OFF data for controlling ON/OFF of an actuator in a predetermined control cycle, adapted to receive a feedback value from a counter unit and transmit a target value and a timing adjustment value to the control device, the counter unit comprises:
a measurement unit configured to count a number of pulses of a pulse signal and measures an actual measurement value;
a comparison unit configured to determine a match between the actual measurement value measured by the measurement unit and the target value;
an output unit configured to execute an output to the actuator when the comparison unit determines that the actual measurement value and the target value match; and
a communication unit configured to receive the target value and the timing adjustment value from the control device that performs an input and output process on the ON/OFF data in a predetermined control cycle, wherein the output unit comprises an output delay unit configured to adjust a timing of the output from a first point in time when the comparison unit determines that the actual measurement value and the target value match to a second point in time when a time independent of a cycle of the pulse signal indicated by the timing adjustment value has elapsed, wherein the output unit is constituted by a logic circuit based on hardware, and the time indicated by the timing adjustment value is an integer multiple of a clock of the logic circuit wherein the timing adjustment value is updated using a feedback value indicating an actual state of a workpiece realized by the actuator to which the output is accepted from the counter unit, the control device comprising:
an update unit configured to update the timing adjustment value using a value indicating an actual state of a workpiece realized by the actuator to which an output is accepted from the counter unit as the feedback value related to the output,
wherein the timing adjustment value updated by the update unit and the target value are transmitted to the counter unit.

8. The control device according to claim 7, wherein the update unit updates the timing adjustment value using a difference between a reference value indicating a predetermined ideal state of the workpiece to be realized by the actuator to which the output is accepted and a value calculated by statistically processing a plurality of the feedback values.

9. A control system comprising:
an counter unit comprising:
a measurement unit configured to count a number of pulses of a pulse signal and measures an actual measurement value;
a comparison unit configured to determine a match between the actual measurement value measured by the measurement unit and a target value;
an output unit configured to execute an output to an actuator when the comparison unit determines that the actual measurement value and the target value match; and
a communication unit configured to receive the target value and the timing adjustment value from a control device that performs an input and output process on ON/OFF data for controlling ON/OFF of the actuator in a predetermined control cycle, wherein the output unit comprises an output delay unit configured to adjust a timing of the output from a first point in time when the comparison unit determines that the actual measurement value and the target value match to a second point in time when a time independent of a cycle of the pulse signal indicated by a timing adjustment value has elapsed, wherein the output unit is constituted by a logic circuit based on hardware, and the time indicated by the timing adjustment value is an integer multiple of a clock of the logic circuit wherein the timing adjustment value is updated using a feedback value indicating an actual state of a workpiece realized by the actuator to which the output is accepted from the counter unit;

the control device that performs the input and output process on the ON/OFF data in the predetermined control cycle, the control device comprising:
an update unit configured to update a timing adjustment value using a value indicating an actual state of a workpiece realized by the actuator to which an output is accepted from a counter unit as a feedback value related to the output, wherein the timing adjustment value updated by the update unit and a target value are transmitted to the counter unit; and a state detection device that detects an actual state of the workpiece realized by the actuator to which the output is accepted from the counter unit and transmits a value indicating the detected actual state of the workpiece as the feedback value to the control device.

10. The control system according to claim 9, wherein the control device updates the timing adjustment value using a difference between a reference value indicating a predetermined ideal state of the workpiece to be realized by the actuator to which the output is accepted and a value calculated by statistically processing a plurality of the feedback values.

* * * * *